US012570508B2

(12) United States Patent
Nelson et al.

(10) Patent No.: US 12,570,508 B2
(45) Date of Patent: Mar. 10, 2026

(54) DROP CAMERA ASSEMBLY

(71) Applicant: Bastian Solutions, LLC, Indianapolis, IN (US)

(72) Inventors: Timothy R. Nelson, Boise, ID (US); Jeremiah Scott Schroeder, Boise, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 127 days.

(21) Appl. No.: 18/599,754

(22) Filed: Mar. 8, 2024

(65) Prior Publication Data

US 2024/0308826 A1 Sep. 19, 2024

Related U.S. Application Data

(60) Provisional application No. 63/490,129, filed on Mar. 14, 2023.

(51) Int. Cl.
*B66F 9/075* (2006.01)
*B66F 17/00* (2006.01)

(52) U.S. Cl.
CPC ........ *B66F 9/07504* (2013.01); *B66F 17/003* (2013.01)

(58) Field of Classification Search
CPC ........................... B66F 9/07504; B66F 17/003
See application file for complete search history.

(56) References Cited

U.S. PATENT DOCUMENTS

2016/0090285 A1 3/2016 Svensson et al.

FOREIGN PATENT DOCUMENTS

| | | | | |
|---|---|---|---|---|
| CN | 104760907 | A | 4/2015 | |
| CN | 115432646 | A | 12/2022 | |
| DE | 102020200896 | A1 | 9/2021 | |
| EP | 2345620 | A1 | 7/2011 | |
| EP | 3718951 | A1 * | 10/2020 | ............ B66F 9/0755 |
| JP | 2003212494 | A | 7/2003 | |
| JP | 2003312995 | A * | 11/2003 | |
| KR | 20160076199 | A | 6/2016 | |
| KR | 20220159620 | A | 12/2022 | |
| KR | 20230006769 | A | 1/2023 | |
| WO | 2023033550 | A1 | 3/2023 | |

OTHER PUBLICATIONS

PCT, Int. App. No. PCT/US2024/0169643 International Search Report, 3 pages, Jul. 5, 2024.
PCT, Int. App. No. PCT/US2024/0169643 Written Opinion of the International Searching Authority, 5 pages, Jul. 5, 2024.

* cited by examiner

*Primary Examiner* — Minh Q Phan
(74) *Attorney, Agent, or Firm* — Woodard, Emhardt, Henry, Reeves & Wagner, LLP

(57) ABSTRACT

A forklift includes a carriage that has one or more forks. A drop camera assembly is coupled to the forklift. The drop camera assembly includes a drop camera. The drop camera is configured to move from a retracted position to an extended position. The drop camera is located proximal to the forks when in the retracted position. The drop camera is positioned away from the carriage when in the extended position so as to image one or more obstacles under the forks of the carriage. The drop camera assembly further includes a carriage camera that is secured to the carriage. The carriage camera is configured to show alignment of the forks relative to a pallet or other object to be handled by the forklift.

20 Claims, 15 Drawing Sheets

DROP CAMERA ASSEMBLY

CROSS REFERENCE TO RELATED APPLICATIONS

This application claims the benefit of U.S. Patent Application No. 63/490,129, filed Mar. 14, 2023, which is hereby incorporated by reference.

BACKGROUND

Forklift trucks are commonly used to move, place, and stack pallets as well as other objects such as in warehouses and manufacturing plants. Forklift trucks can be manually operated. However, there has been a recent trend of having the forklift truck to be autonomously or semi-autonomously operated. For instance, Automated Guided Vehicle (AGV) or autonomous forklift trucks are becoming more common. When the forklift truck places a pallet, a target location or area for where the pallet is to be placed generally needs to be clear of any obstacles. If the area is not clear of obstacles, significant damage to the obstacle, the forklift truck, and/or any items on the pallet may occur.

Thus, there is a need for improvement in this field.

SUMMARY

To address the above-mentioned as well as other issues, a unique drop camera assembly has been developed. The drop camera assembly is designed to be incorporated into the forklift truck, either as an original equipment manufacturing (OEM) part or as a retrofitted aftermarket part. Among other things, the drop camera assembly includes a carriage camera and a drop camera to aid in visualizing the environment surrounding the forklift. The carriage camera generally remains stationary relative to the forks coupled to the carriage of the forklift. In such a position, the carriage camera helps to visualize the fork openings in the pallet so as to aid in guiding the forks into the fork openings of the pallet.

As noted before, when the forklift truck places the pallet at a target location, the target location generally needs to be clear of any obstructions or obstacles. To detect these obstructions, the drop camera is used to view the target location. Initially, the drop camera is nested or aligned with the carriage camera that is generally aligned with the forks of the carriage. However, the view at this position can be obstructed such as by a pallet loaded on the forks. In this assembly, the drop camera drops below the on-fork pallet to view whether another pallet or other obstruction is present prior to placing the on-fork pallet at the target location. The drop camera further facilitates determining or obtaining alignment to the target location for placement of the on-fork pallet. When in this extended or dropped position, the drop camera can be damaged during routine use. To reduce the risk of damage, the drop camera retracts when the forks on the carriage of the forklift truck are lowered to ground level. This drop camera assembly can be notably helpful for autonomous or semi-autonomous forklift truck applications where lidars are used. For example, this dual actuation also ensures the drop camera is moved out of the way of navigation lidars when the forks are lowered for normal operation.

In one example, the drop camera is used to detect pallet presence and the carrier camera is used to determine alignment of the pallet being loaded onto the forks. During use, the drop camera drops below the picked pallet on the forks of the truck. When positioned below the picked pallet on the forks, the drop camera provides a view below the forks for checking if another pallet is present prior to placing the current pallet at the target location. The other camera, or carriage camera, is statically mounted at a stationary position to the carriage or elsewhere on the forklift truck. The stationary carriage camera is used when a pallet is intended to be picked. Images from the alignment or carriage camera are used by a control system to determine the relative alignment of the pallet to ensure the pallet can be properly picked up.

The drop camera is capable of retracting away from the ground (or in an upwards direction) in the event the carriage and/or mast is lowered to ground level. The actuated, drop camera operates or moves in a passive manner when the carriage with the forks is raised. In one version, one or more gas springs are used to move the drop camera in a vertical direction relative to the forks and mast, and in one form, at least two gas springs are used to raise and lower the drop camera. As the carriage and/or mast is raised in this form, the gas springs push the drop camera in a downwards direction towards the ground. When the mast is lowered a first gas spring pushes the drop camera upwards into another or second gas spring that is then actuated further. As should be appreciated, navigation lidars are used by autonomous vehicles, such as AGV or autonomous forklift trucks, to facilitate navigation. This dual actuation of the gas springs of the drop camera assembly ensures the drop camera is moved out of the way of any navigation lidars when the mast is lowered for normal operation.

This drop camera assembly with the passive, gas-spring mechanical components allows the drop camera to have a predictable location in both the dropped position and the raised position. With this ability to accurately locate the drop camera in both positions, the control system of the forklift truck is able to accurately determine the location and orientation of various objects like pallets. This fully mechanical actuation of the drop camera assembly is reliable, because the movement of the drop camera occurs passively during the normal operation of the forklift truck. Moreover, the mechanical components used can make the drop camera assembly relatively inexpensive.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a forklift.

Aspect 3 generally concerns the system of any previous aspect in which the forklift has a mast.

Aspect 4 generally concerns the system of any previous aspect in which the mast is a triplex type mast.

Aspect 5 generally concerns the system of any previous aspect in which the mast is a single-stage type mast.

Aspect 6 generally concerns the system of any previous aspect in which the mast is a double-stage type mast.

Aspect 7 generally concerns the system of any previous aspect in which the mast is a quad-stage type mast.

Aspect 8 generally concerns the system of any previous aspect in which the mast includes a stationary rail.

Aspect 9 generally concerns the system of any previous aspect in which the mast includes a carriage rail.

Aspect 10 generally concerns the system of any previous aspect in which the mast includes an intermediate rail.

Aspect 11 generally concerns the system of any previous aspect in which the intermediate rail is disposed between the stationary rail and the carriage rail.

Aspect 12 generally concerns the system of any previous aspect in which the intermediate rail and the carriage rail are configured to move in a telescoping manner.

Aspect 13 generally concerns the system of any previous aspect in which the forklift has a carriage.

Aspect 14 generally concerns the system of any previous aspect in which the mast is configured to move the carriage.

Aspect 15 generally concerns the system of any previous aspect in which the carriage has one or more forks.

Aspect 16 generally concerns the system of any previous aspect in which the forks are configured to handle a pallet.

Aspect 17 generally concerns the system of any previous aspect in which the forklift has a lidar.

Aspect 18 generally concerns the system of any previous aspect in which the forklift has a drop camera assembly.

Aspect 19 generally concerns the system of any previous aspect in which the drop camera assembly is configured to view for one or more obstacles under the carriage.

Aspect 20 generally concerns the system of any previous aspect in which the drop camera assembly is configured to view for one or more obstacles under the forks.

Aspect 21 generally concerns the system of any previous aspect in which the drop camera assembly includes a drop camera.

Aspect 22 generally concerns the system of any previous aspect in which the drop camera is configured to image one or more obstacles under the forks of the carriage.

Aspect 23 generally concerns the system of any previous aspect in which the drop camera is configured to move from a retracted position to an extended position.

Aspect 24 generally concerns the system of any previous aspect in which the drop camera is located proximal to the forks when in the retracted position.

Aspect 25 generally concerns the system of any previous aspect in which the drop camera is positioned away from the carriage when in the extended position.

Aspect 26 generally concerns the system of any previous aspect in which the drop camera is positioned underneath the forks when in the extended position.

Aspect 27 generally concerns the system of any previous aspect in which the drop camera assembly includes a carriage camera.

Aspect 28 generally concerns the system of any previous aspect in which the carriage camera is configured to visualize the forks and the pallet when the pallet is loaded on the forks.

Aspect 29 generally concerns the system of any previous aspect in which the carriage camera is configured to facilitate alignment of the forklift truck with the pallet.

Aspect 30 generally concerns the system of any previous aspect in which the carriage camera is secured to the carriage.

Aspect 31 generally concerns the system of any previous aspect in which the carriage camera is secured at a stationary position relative to the forks.

Aspect 32 generally concerns the system of any previous aspect in which the carriage camera is configured to show alignment of the forks relative to a pallet.

Aspect 33 generally concerns the system of any previous aspect in which the drop camera and the carriage camera are located offset to one another to facilitate nesting of the drop camera and the carriage camera.

Aspect 34 generally concerns the system of any previous aspect in which the drop camera and the carriage camera are offset to one another along a longitudinal axis when nested together.

Aspect 35 generally concerns the system of any previous aspect in which the drop camera and the carriage camera are aligned with one another along the longitudinal axis when nested together.

Aspect 36 generally concerns the system of any previous aspect in which the drop camera and the carriage camera are nested together when the drop camera is in the retracted position.

Aspect 37 generally concerns the system of any previous aspect in which the drop camera and the carriage camera are nested together at the carriage.

Aspect 38 generally concerns the system of any previous aspect in which the drop camera assembly includes a carriage frame to which the carriage camera is secured.

Aspect 39 generally concerns the system of any previous aspect in which the carriage frame is secured to the carriage.

Aspect 40 generally concerns the system of any previous aspect in which the carriage frame includes a frame base and one or more frame arms extending from the frame base.

Aspect 41 generally concerns the system of any previous aspect in which the carriage frame has a U-shape.

Aspect 42 generally concerns the system of any previous aspect in which the frame arms are secured to the carriage.

Aspect 43 generally concerns the system of any previous aspect in which the carriage frame has a carriage camera flange extending from the frame base.

Aspect 44 generally concerns the system of any previous aspect in which the carriage camera is secured to the carriage camera flange.

Aspect 45 generally concerns the system of any previous aspect in which the carriage camera flange extends below the carriage.

Aspect 46 generally concerns the system of any previous aspect in which the drop camera assembly includes a drop frame to which the drop camera is secured.

Aspect 47 generally concerns the system of any previous aspect in which the drop frame includes a rail flange.

Aspect 48 generally concerns the system of any previous aspect in which the drop frame includes a guard flange.

Aspect 49 generally concerns the system of any previous aspect in which the guard flange extends in a transverse direction relative to the rest of the drop frame to form an overall L-shape.

Aspect 50 generally concerns the system of any previous aspect in which the guard flange is configured to protect the drop camera.

Aspect 51 generally concerns the system of any previous aspect in which the guard flange extends past the drop camera to cover the carriage camera when the drop camera and the carriage camera are nested together.

Aspect 52 generally concerns the system of any previous aspect in which the guard flange is configured to protect the carriage camera when nested with the drop camera.

Aspect 53 generally concerns the system of any previous aspect in which the drop camera is secured to the drop frame via one or more fasteners.

Aspect 54 generally concerns the system of any previous aspect in which the drop camera assembly includes a frame linkage coupling the carriage frame to the drop frame.

Aspect 55 generally concerns the system of any previous aspect in which the frame linkage is configured to fold when the drop camera is in the retracted position.

Aspect 56 generally concerns the system of any previous aspect in which the frame linkage is configured to unfold when the drop camera is in the extended position.

Aspect 57 generally concerns the system of any previous aspect in which the frame linkage includes two or more linkage arms pivotally coupled together.

Aspect 58 generally concerns the system of any previous aspect in which the linkage arms are pivotally coupled to the carriage frame and the drop frame.

Aspect 59 generally concerns the system of any previous aspect in which the linkage arms define one or more notches.

Aspect 60 generally concerns the system of any previous aspect in which the drop camera assembly includes a camera position linkage coupling the carriage frame to the drop frame.

Aspect 61 generally concerns the system of any previous aspect in which the camera position linkage is configured to extend the drop camera away from the carriage camera.

Aspect 62 generally concerns the system of any previous aspect in which the camera position linkage is configured to extend the drop camera to the extended position.

Aspect 63 generally concerns the system of any previous aspect in which the camera position linkage is configured to retract the drop camera to the retracted position.

Aspect 64 generally concerns the system of any previous aspect in which the camera position linkage is configured to drop the drop camera below the forks to a dropped position to view obstructions.

Aspect 65 generally concerns the system of any previous aspect in which the drop camera is configured to view obstructions when in the extended position.

Aspect 66 generally concerns the system of any previous aspect in which the camera position linkage is biased to extend the drop camera to the extended position in a passive manner.

Aspect 67 generally concerns the system of any previous aspect in which the camera position linkage uses a two-way action to extend the drop camera to the extended position.

Aspect 68 generally concerns the system of any previous aspect in which the camera position linkage includes an adapter plate.

Aspect 69 generally concerns the system of any previous aspect in which the adapter plate is secured to at least one of the frame arms of the carriage frame.

Aspect 70 generally concerns the system of any previous aspect in which the camera position linkage includes a rail.

Aspect 71 generally concerns the system of any previous aspect in which the drop frame is secured to the rail.

Aspect 72 generally concerns the system of any previous aspect in which the rail is secured to the rail flange of the drop frame.

Aspect 73 generally concerns the system of any previous aspect in which the camera position linkage includes a rail bearing.

Aspect 74 generally concerns the system of any previous aspect in which the rail bearing is slidably coupled to the rail.

Aspect 75 generally concerns the system of any previous aspect in which the rail bearing defines a rail channel in which the rail is received.

Aspect 76 generally concerns the system of any previous aspect in which the rail bearing is secured to the adapter plate.

Aspect 77 generally concerns the system of any previous aspect in which the camera position linkage includes a base.

Aspect 78 generally concerns the system of any previous aspect in which the base is secured to the rail.

Aspect 79 generally concerns the system of any previous aspect in which the camera position linkage includes a detector configured to detect the position of the drop camera.

Aspect 80 generally concerns the system of any previous aspect in which the detector is configured to detect when the drop camera is in the extended position.

Aspect 81 generally concerns the system of any previous aspect in which the detector includes a sensor plate and a sensor configured to detect the presence of the sensor plate.

Aspect 82 generally concerns the system of any previous aspect in which the adapter plate is secured to the base.

Aspect 83 generally concerns the system of any previous aspect in which the sensor is positioned on the adapter plate.

Aspect 84 generally concerns the system of any previous aspect in which the camera position linkage includes one or more actuators configured to facilitate extension and retraction of the drop camera.

Aspect 85 generally concerns the system of any previous aspect in which the actuators are biased to move the drop camera to the extended position.

Aspect 86 generally concerns the system of any previous aspect in which the actuators include springs.

Aspect 87 generally concerns the system of any previous aspect in which the actuators include gas springs.

Aspect 88 generally concerns the system of any previous aspect in which the actuators are coupled to the base.

Aspect 89 generally concerns the system of any previous aspect in which the actuators include a primary actuator and a secondary actuator.

Aspect 90 generally concerns the system of any previous aspect in which the camera position linkage includes the primary actuator.

Aspect 91 generally concerns the system of any previous aspect in which the primary actuator includes a primary barrel and a primary rod extending from the primary barrel.

Aspect 92 generally concerns the system of any previous aspect in which the primary rod is configured to move in a reciprocating manner relative to the primary barrel.

Aspect 93 generally concerns the system of any previous aspect in which the camera position linkage includes a primary actuator mount.

Aspect 94 generally concerns the system of any previous aspect in which the primary actuator is coupled to the primary actuator mount.

Aspect 95 generally concerns the system of any previous aspect in which the primary barrel is coupled to the primary actuator mount.

Aspect 96 generally concerns the system of any previous aspect in which the primary actuator mount is secured to the mast.

Aspect 97 generally concerns the system of any previous aspect in which the primary actuator mount is secured to the carriage.

Aspect 98 generally concerns the system of any previous aspect in which the primary rod is coupled to the base.

Aspect 99 generally concerns the system of any previous aspect in which the primary actuator is a gas spring.

Aspect 100 generally concerns the system of any previous aspect in which the primary rod is biased to extend from the primary barrel.

Aspect 101 generally concerns the system of any previous aspect in which the camera position linkage includes the secondary actuator.

Aspect 102 generally concerns the system of any previous aspect in which the secondary actuator includes a secondary barrel and a secondary rod extending from the secondary barrel.

Aspect 103 generally concerns the system of any previous aspect in which the secondary rod is configured to move in a reciprocating manner relative to the secondary barrel.

Aspect 104 generally concerns the system of any previous aspect in which the drop camera assembly includes a damper.

Aspect 105 generally concerns the system of any previous aspect in which the damper is secured to the mast.

Aspect 106 generally concerns the system of any previous aspect in which the damper is secured to the carriage rail.

Aspect 107 generally concerns the system of any previous aspect in which the damper includes a stop body and a stop member coupled to the base.

Aspect 108 generally concerns the system of any previous aspect in which the damper is configured to compress the secondary actuator.

Aspect 109 generally concerns the system of any previous aspect in which the stop member is threadedly secured to the stop body to adjust a distance where the secondary actuator contacts the stop member.

Aspect 110 generally concerns the system of any previous aspect in which the secondary rod has a free end configured to contact the damper.

Aspect 111 generally concerns the system of any previous aspect in which the secondary rod has a buffer configured to contact the damper.

Aspect 112 generally concerns the system of any previous aspect in which the secondary barrel is secured to the base.

Aspect 113 generally concerns the system of any previous aspect in which the secondary actuator is a gas spring.

Aspect 114 generally concerns the system of any previous aspect in which the damper is configured to compress the primary actuator and the secondary actuator when the carriage is lowered.

Aspect 115 generally concerns the system of any previous aspect in which the damper is configured to compress the primary actuator and the secondary actuator to have the drop camera at the retracted position.

Aspect 116 generally concerns the system of any previous aspect in which the drop camera assembly is configured to position the drop camera to avoid interference with the lidar.

Aspect 117 generally concerns a method.

Aspect 118 generally concerns the method of any previous aspect including raising one or more forks of a forklift.

Aspect 119 generally concerns the method of any previous aspect including lowering a drop camera to a dropped position below the forks of the forklift.

Aspect 120 generally concerns the method of any previous aspect including viewing an obstacle below the forks with the drop camera.

Aspect 121 generally concerns the method of any previous aspect including lowering the forks of the forklift.

Aspect 122 generally concerns the method of any previous aspect including moving the drop camera to a retracted position where the drop camera is aligned with the forks.

Aspect 123 generally concerns the method of any previous aspect including aligning the forks with one or more fork openings in a pallet by viewing with a carriage camera that is located at a stationary position relative to the forks.

Aspect 124 generally concerns the method of any previous aspect in which the raising includes picking up the pallet with the forks.

Aspect 125 generally concerns the method of any previous aspect including nesting the drop camera with the carriage camera at the retracted position.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
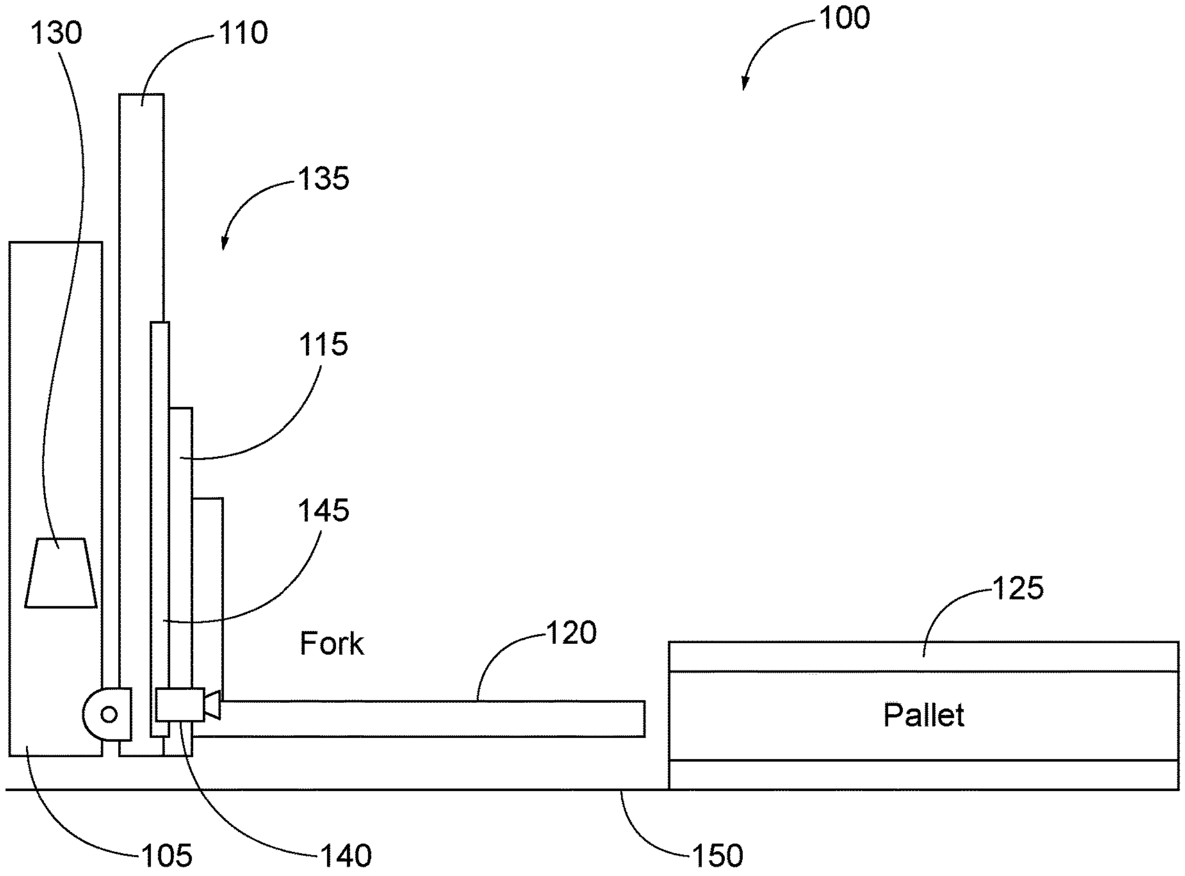
FIG. 1 is a side view of a forklift system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a “100” series reference numeral will likely first appear in FIG. 1, an element identified by a “200” series reference numeral will likely first appear in FIG. 2, and so on.

A forklift system 100 according to one example is illustrated in FIG. 1. As shown, the system 100 includes a forklift 105. The forklift 105 includes a mast 110 and a carriage 115 with one or more forks 120. The mast 110 is configured to raise and lower the carriage 115. The forks 120 are configured to engage a pallet 125. In one version, the forklift 105 is in the form of an automated guided vehicle (AGV) or autonomous forklift 105. The forklift 105 in the illustrated example includes a lidar 130. The lidar 130 is configured to help guide the forklift 105 and locate obstacles as the forklift 105 moves through a facility such as a warehouse or manufacturing plant. The forklift 105 further includes a drop camera assembly 135 with one or more cameras 140 and a camera position linkage 145 that is configured to position the cameras 140. Most of the components of the drop camera assembly 135 are made of metal, such as steel and/or aluminum, but selected components can further include plastics or elastomeric materials.

As will be explained below, at least some of the cameras 140 are used to detect obstacles or obstructions. For instance, at least one of the cameras 140 is configured to detect objects dropped below the on-fork pallet 125 to view whether another pallet 125 or other obstacle is present prior to placing the current on-fork pallet 125. At least one of the cameras 140 is configured to retract via the camera position linkage 145 when the mast 110 lowers the carriage 115 with the forks 120 towards the ground or floor 150. The purpose of this dual action of the camera position linkage 145 of the drop camera assembly 135 is to ensure that the cameras 140 are moved out of the way of any navigation lidar 130 when the mast 110 is lowered during normal operation. The camera position linkage 145 has a unique mechanical design to move at least one of the cameras 140. When the carriage 115 is raised, at least two gas springs push the cameras 140 downwards. When the carriage 115 via the mast 110 is lowered, a first one of the gas springs pushes one of the cameras 140 upwards into a second gas spring that is then actuated further.

Figure 2:
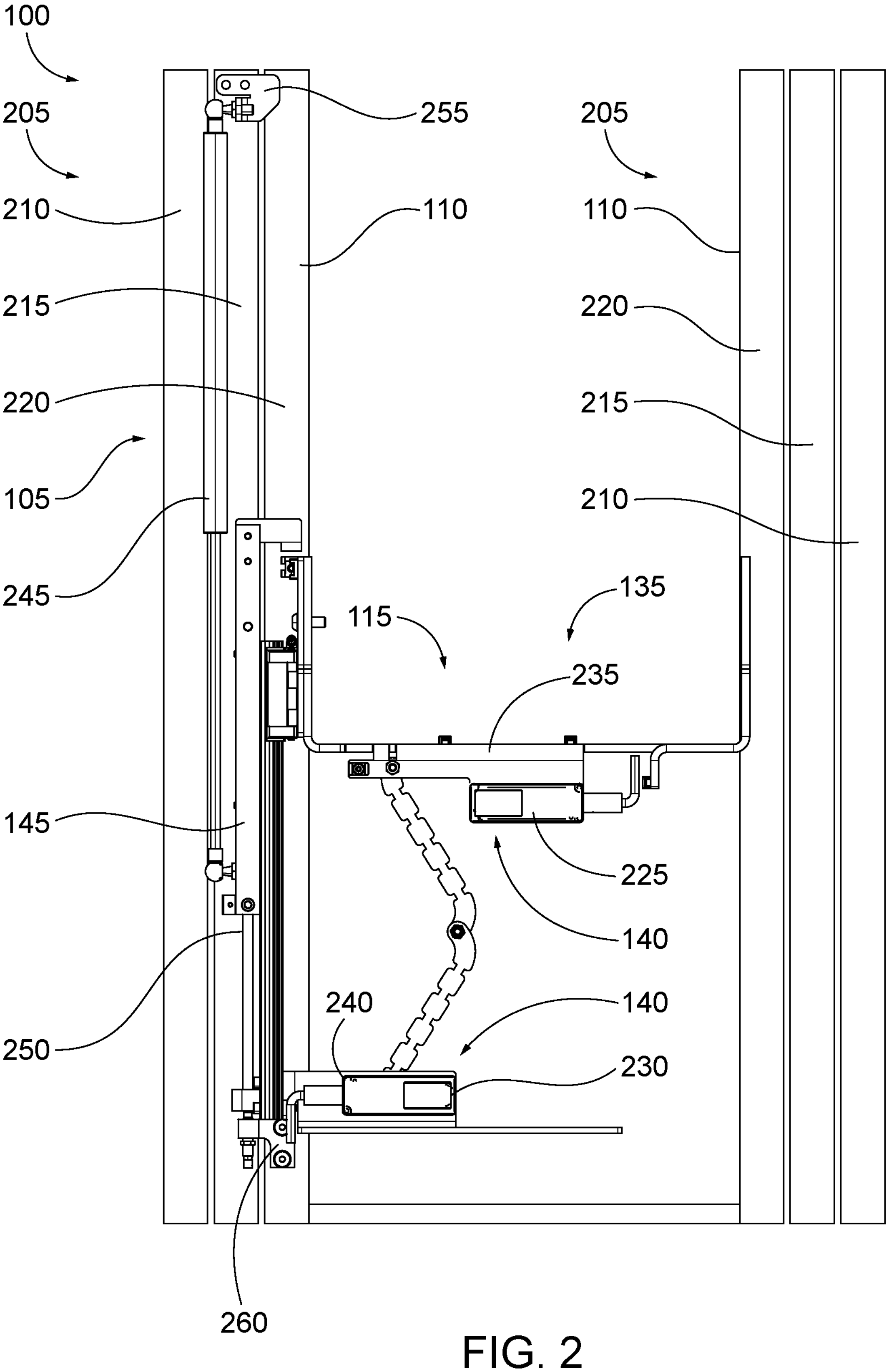
FIG. 2 is a front view of a mast and a drop camera assembly in a forklift of the system of FIG. 1.

FIG. 2 shows a front view of the drop camera assembly 135 mounted to the mast 110 of the forklift 105. The mast 110 of the forklift 105 includes one or more rails 205 positioned on opposite sides of the carriage 115. The rails 205 of the mast 110 are configured to move in a telescoping manner such as via lift cylinders, chains, and/or pulleys that raise and lower the carriage 115. In the illustrated example, the mast 110 is a three-stage type mast or a triplex type of mast. In other examples, the mast 110 can come in other forms such as a single-stage, double-stage or quad-stage type mast arrangement. The mast 110 on each side of the carriage 115 includes a stationary rail 210, an intermediate rail 215, and a carriage rail 220 that are arranged in a nesting or telescoping manner. As can be seen, the intermediate rail 215 is positioned between the stationary rail 210 and the carriage rail 220. The stationary rail 210 is fixed in a stationary manner relative to the forklift 105. The carriage 115 is slidably coupled to the mast 110 via the carriage rail 220. The intermediate rail 215 and carriage rail 220 in the mast 110 move in a telescopic manner so as to facilitate further elevation of the forks 120 on the carriage 115.

In the illustrated example, the drop camera assembly 135 includes at least two cameras 140, but in other examples, the drop camera assembly 135 can include more than two cameras 140. In particular, the drop camera assembly 135 includes a carriage camera 225 that is positioned proximal to the forks 120 of the carriage 115 so as to facilitate alignment of the forks 120 into the fork openings of the pallet 125. The drop camera assembly 135 further includes a drop camera 230 that is positioned to drop below the carriage 115 so that the operator of the forklift 105 is able to detect dropped objects, such as other misplaced pallets 125, or other obstructions underneath the forks 120 of the forklift 105. The carriage camera 225 is secured to the carriage 115 via a carriage frame 235 that is mounted to the carriage 115. The drop camera 230 is mounted to a drop frame 240 that is able to position the drop camera 230 in a dropped position at the appropriate time to view obstructions. As can be seen, the carriage frame 235 and the drop frame 240 position the carriage camera 225 and drop camera 230 in an offset manner such that when the drop frame 240 is collapsed or retracted, the carriage camera 225 and the drop camera 230 are arranged in a side by side manner so as to provide a compact profile.

The camera position linkage 145 couples the drop frame 240 to the carriage frame 235 in a generally telescoping manner. To facilitate this telescoping or double action motion, the camera position linkage 145 includes at least a primary actuator 245 and a secondary actuator 250. In other examples, the camera position linkage 145 can include a single actuator or more than two actuators. In the illustrated example, the primary actuator 245 and the secondary actuator 250 are each pneumatic or gas springs, but the primary actuator 245 and the secondary actuator 250 can include other types of actuators in other examples. For instance, the primary actuator 245 and the secondary actuator 250 can include torsion springs, hydraulic actuators, and/or solenoids. In the depicted example, the primary actuator 245 and the secondary actuator 250 are passive type actuators, but in other examples, the primary actuator 245 and the secondary actuator 250 can be active actuators in which hydraulic fluid, electrical energy, or some other type of power transmission source is used to actively actuate or move the actuators. The primary actuator 245 and the secondary actuator 250 in the depicted example are biased to naturally be in an extended state, but in other variations, one or both of the primary actuator 245 and the secondary actuator 250 can be normally biased to a retracted state. In one form, the primary actuator 245 and the secondary actuator 250 are biased to the extended state at least via gravity, but the primary actuator 245 and the secondary actuator 250 can be biased in other manners, such as via internal springs and/or compressed fluids. The primary actuator 245 is mounted to the carriage 115 via a primary actuator mount 255. In one example, the primary actuator mount 255 is bolted to the carriage 115, but in other examples the primary actuator mount 255 can be secured to the carriage 115 of the mast 110 in other ways, such as via welding and/or an adhesive, or to other components of the carriage 115. The secondary actuator 250 is actuated by a damper 260 that is mounted on the carriage rail 220 of the mast 110. The damper 260 facilitates the retraction or collapse of the secondary actuator 250 so that the carriage camera 225 and drop camera 230 are nested together in a side-by-side manner when the carriage 115 is lowered to the floor 150.

Figure 3:
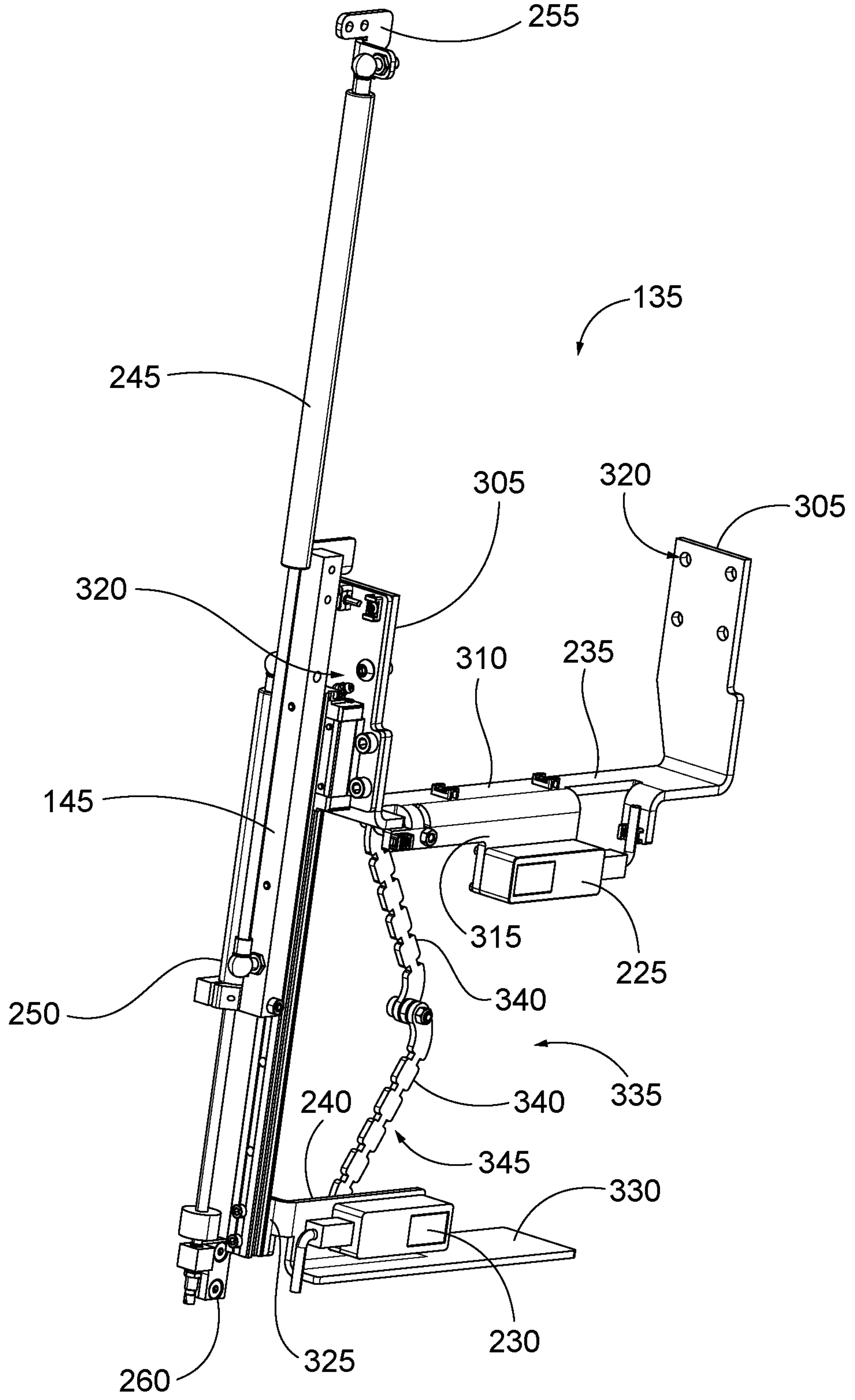
FIG. 3 is a front perspective view of the drop camera assembly shown in FIG. 2.
Figure 4:
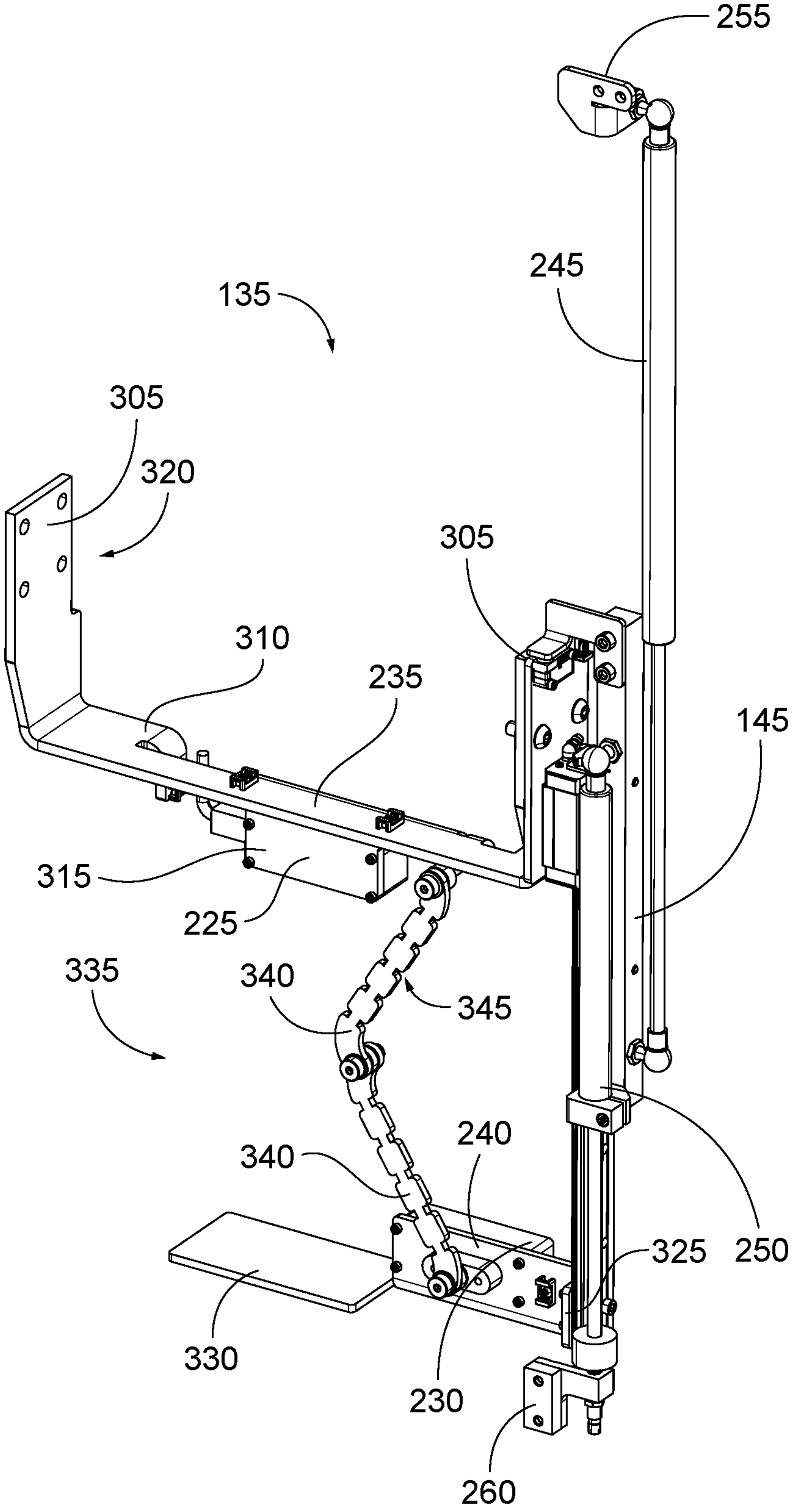
FIG. 4 is a rear perspective view of the drop camera assembly of FIG. 3.

FIGS. 3 and 4 respectively show front and rear perspective views of the drop camera assembly 135. The carriage frame 235 of the drop camera assembly 135 has a general U-shape. As can be seen, the carriage frame 235 has one or more frame arms 305 and a frame base 310 extending between the frame arms 305. The frame arms 305 extend at a transverse angle relative to the frame base 310 at both ends of the frame base 310. In the illustrated example, the carriage frame 235 has two frame arms 305, but in other examples, the carriage frame 235 can have a single frame arm 305 or more than two frame arms 305. As can be seen a carriage camera flange 315 extends from the frame base 310. The carriage camera 225 is secured to the carriage camera flange 315 of the carriage frame 235. For instance, the carriage camera 225 can be bolted to the carriage camera flange 315, but in other examples, the carriage camera 225 can be secured to the carriage camera flange 315 in other ways such as via welding or rivets. The carriage camera flange 315 is positioned at or slightly below the forks 120 so that the carriage camera 225 is positioned at or below the forks 120. The carriage camera flange 315 provides enough stiff support for the carriage camera 225 so that the images are not blurry when the forklift 105 is used. In the illustrated example, each of the frame arms 305 have one or more fastener openings 320 in which fasteners, such as bolts, are received to secure the carriage frame 235. In the depicted example, the fastener openings 320 in the frame arms 305 of one of the frame arms 305 receives fasteners that secure the carriage frame 235 to the camera position linkage 145. The other frame arms 305 can be used to secure the carriage frame 235 to the carriage 115 or other components of the forklift 105. It should be recognized that the carriage frame 235 can be secured in other ways.

With continued reference to FIGS. 3 and 4, the drop frame 240 has a rail flange 325 that extends transverse to the drop frame 240. In the depicted example, the rail flange 325 of the drop frame 240 is secured to the camera position linkage 145 via fasteners, such as bolts, but in other examples, the drop frame 240 can be secured to the camera position linkage 145 in other ways, such as via rivets, adhesives, and/or welding, to name just a few examples. The drop frame 240 has an overall L-shape so as to surround the drop camera 230 on two sides. The drop frame 240 has a guard flange 330 that extends transversely to the drop frame 240 so as to help protect not only the drop camera 230 but also the carriage camera 225. The guard flange 330 extends past the drop camera 230 so as to overlap and cover the carriage camera 225 when the drop camera 230 is in a retracted position where the drop camera 230 and carriage camera 225 are aligned with one another along a longitudinal axis. The guard flange 330 faces the floor 150 in most circumstances so as to help protect the carriage camera 225 and drop camera 230 from being stricken by objects on the ground or elsewhere.

The carriage frame 235 and the drop frame 240 are further coupled together via a frame linkage 335. The frame linkage 335 helps to stabilize both the carriage frame 235 and the drop frame 240 such that the carriage camera 225 and drop camera 230 are able to move smoothly relative to one another. Moreover the frame linkage 335 acts as a chase or wire guide for securing wiring between the carriage frame 235 and drop frame 240, if so desired. In the example illustrated in FIGS. 3 and 4, the frame linkage 335 includes at least two linkage arms 340 that are pivotally coupled together. The ends opposite one another of the linkage arms 340 are also pivotally coupled to the carriage frame 235 and drop frame 240, respectively. When the carriage camera 225 and drop camera 230 are brought close together, the linkage arms 340 pivot such that the frame linkage 335 collapses or folds together. When the drop camera 230 drops or extends away from the carriage camera 225, the frame linkage 335 unfolds such that the linkage arms 340 extend away from one another. Each of the linkage arms 340 further includes one or more notches 345 that can be used to secure wiring, cables, and the like.

Figure 5:
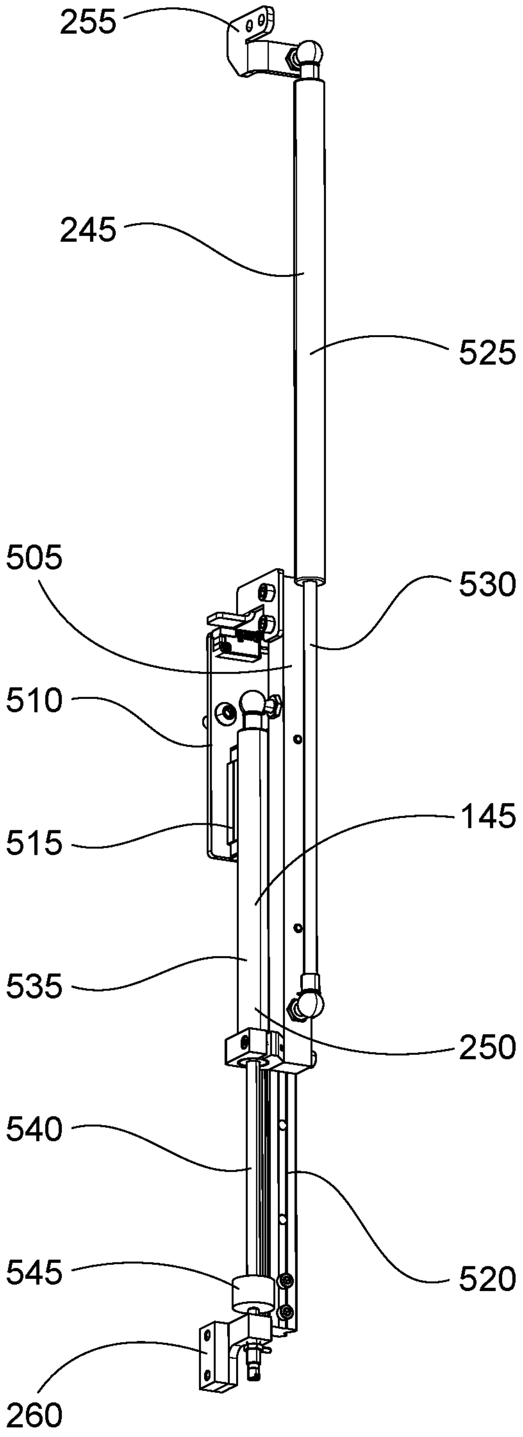
FIG. 5 is a side perspective view of a camera position linkage that is incorporated in the drop camera assembly of FIG. 2.
Figure 6:
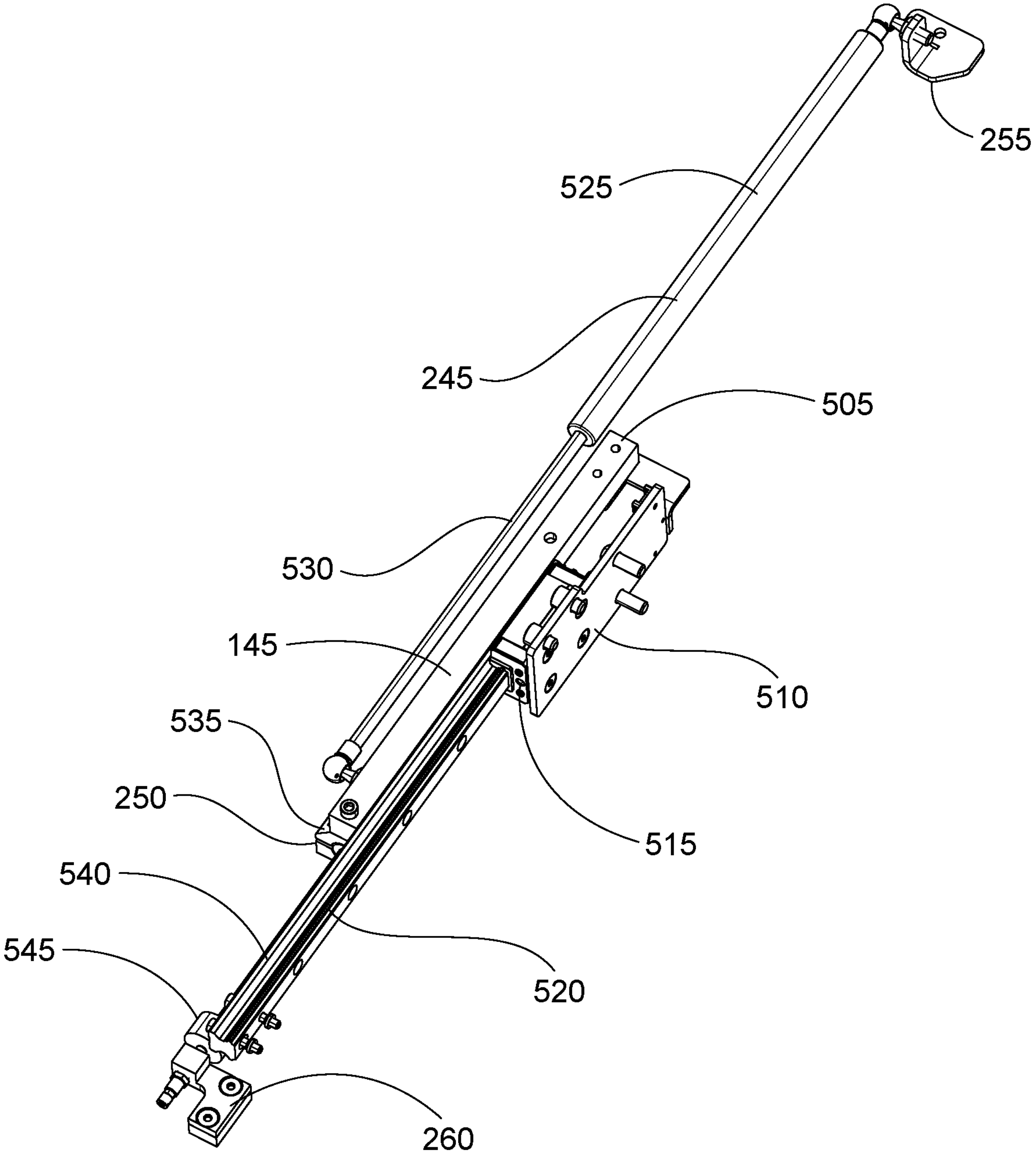
FIG. 6 is a bottom perspective view of the camera position linkage of FIG. 5.

FIGS. 5 and 6 show two different perspective views of the camera position linkage 145. As can be seen, the camera position linkage 145 includes a base 505, an adapter plate 510, a rail bearing 515, and a rail 520. As shown, the rail bearing 515 and the rail 520 are sandwiched between the base 505 and adapter plate 510. The primary actuator 245 and the secondary actuator 250 are both coupled to the base 505. The base 505 is secured to the rail 520, such as via fasteners like bolts, but the base 505 and the rail 520 can be secured together in other manners, such as via rivets, welding, and/or adhesives. The adapter plate 510 is secured to the frame arms 305 of the carriage frame 235, such as via fasteners, but the carriage frame 235 can be secured to the adapter plate 510 in other manners, such as via rivets, adhesives, and/or welding, to name just a few examples. The adapter plate 510 is further secured to the rail bearing 515 via fasteners like bolts, but in other examples, the adapter plate 510 and rail bearing 515 can be secured together in other manners, such as via welding and/or adhesives. The rail bearing 515 is slidably coupled to the rail 520 such that the rail 520 is able to slide relative to the rail bearing 515. With this construction, the adapter plate 510 and the rail bearing 515 are able slide together relative to the base 505 and the rail 520. In other words, the adapter plate 510 and the rail bearing 515 form one unit, and the base 505 and rail 520 form another unit. Both units are able to slide relative to one another via the interface between the rail bearing 515 and the rail 520. As will be explained further below, this construction allows two-phase telescoping motion of the camera position linkage 145 via the primary actuator 245 and the secondary actuator 250.

Opposing ends of the primary actuator 245 extend between the base 505 and the primary actuator mount 255. In particular, the primary actuator 245 includes a primary barrel 525 and a primary rod 530 that is able to extend and retract from the primary barrel 525 in a telescoping manner. One end of the primary barrel 525 is coupled to the primary actuator mount 255, and the opposite end of the primary rod 530 is secured to the base 505. The secondary actuator 250 includes a secondary barrel 535 and a secondary rod 540 which is able to extend and retract relative to the secondary barrel 535 in a telescoping manner. The secondary barrel 535 of the secondary actuator 250 is secured to the base 505. The secondary rod 540 at the opposite end has a buffer 545 that is configured to engage the damper 260. The buffer 545 on the end of the secondary rod 540 is free such that the secondary rod 540 is able to engage and disengage from the damper 260. When the damper 260 contacts the buffer 545, the secondary rod 540 retracts back inside of the secondary barrel 535 such that the secondary actuator 250 is compressed. The primary actuator 245 and the secondary actuator 250 are normally biased to an extended state. That is, the primary rod 530 of the primary actuator 245 is biased to fully extend from the primary barrel 525, and the secondary rod 540 of the secondary actuator 250 is biased to fully extend from the secondary barrel 535. When the forks 120 on the carriage 115 are lowered to the floor 150, the damper 260 contacts the buffer 545 on the secondary actuator 250 so as to initiate compression of the primary actuator 245 and the secondary actuator 250. The primary actuator 245 and the secondary actuator 250 store this compression force as potential energy which is later used to extend the primary rod 530 and the secondary rod 540 when the forks 120 of the carriage 115 are raised from the floor 150.

Figure 7:
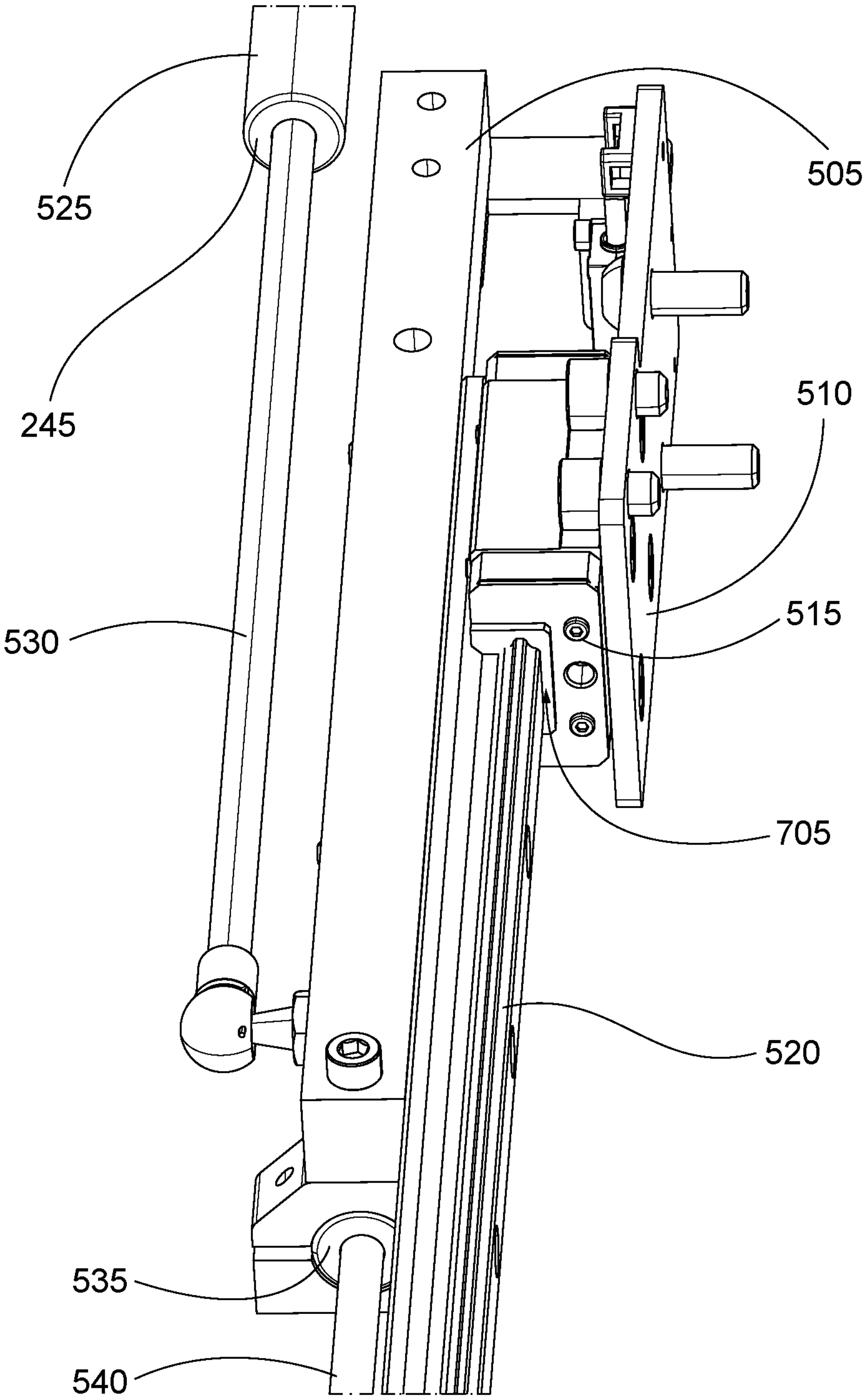
FIG. 7 is an enlarged perspective view of a base, a rail bearing, and a rail in the camera position linkage of FIG. 5.

FIG. 7 shows an enlarged view of the engagement between the rail 520 and the rail bearing 515. As can be seen, the rail bearing 515 defines a rail channel 705 where the rail 520 is slidably disposed in the rail bearing 515. Once more, the adapter plate 510 and the rail bearing 515 are coupled together. The base 505 and the rail 520 are secured together to form a single unit. As a result, the adapter plate 510 and rail bearing 515 are able to slide together relative to the base 505 and the rail 520. With this construction both the primary actuator 245 and the secondary actuator 250 are able to extend and retract in telescoping, dual action manner relative to the carriage 115. This in turn facilitates the drop camera 230 to drop well below the carriage 115 to detect any obstructions below the forks 120 of the carriage 115.

Figure 8:
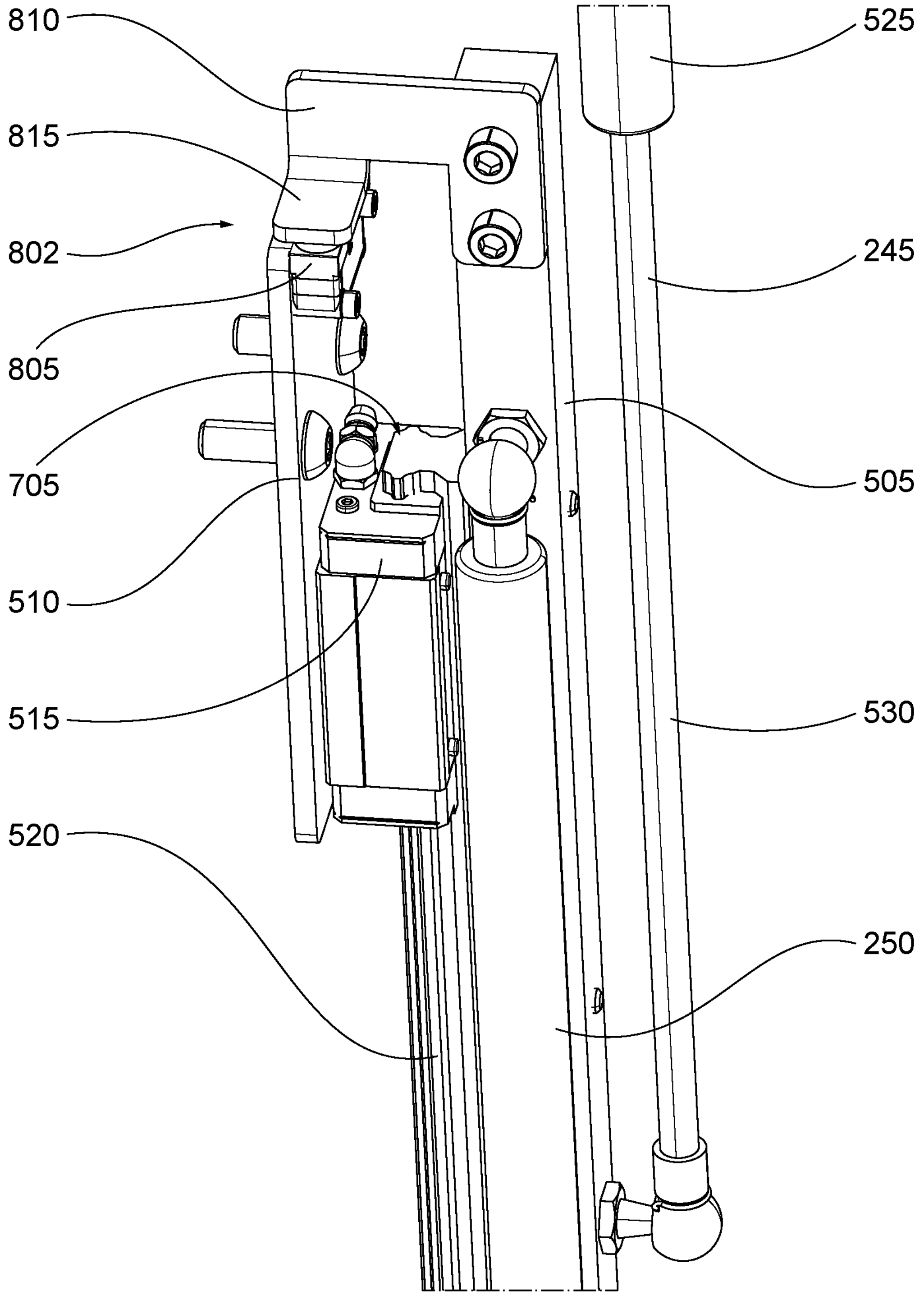
FIG. 8 is a top perspective view of the base, the rail bearing, and the rail shown in FIG. 7.
Figure 9:
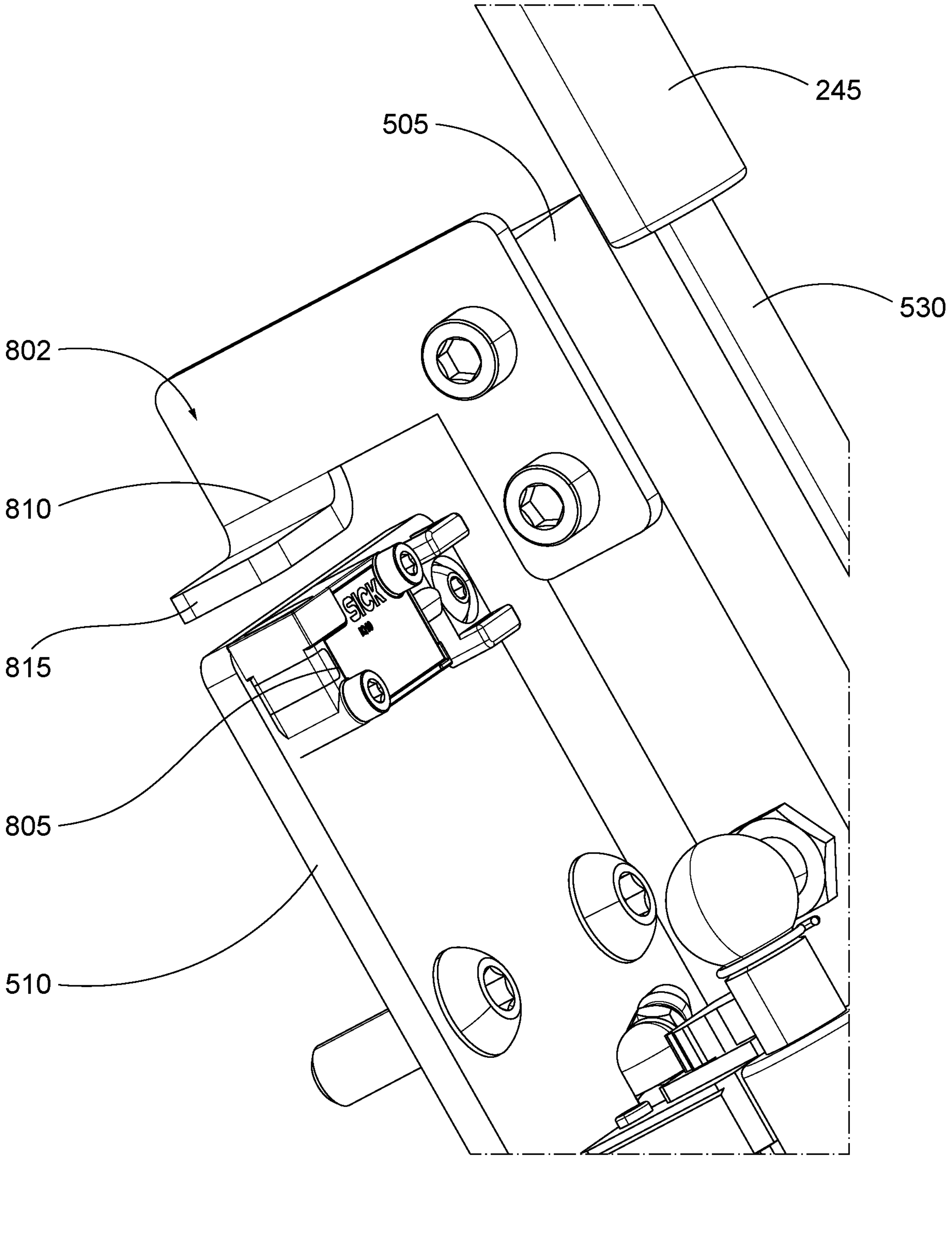
FIG. 9 is an enlarged perspective view of a sensor and a sensor plate used in the camera position linkage of FIG. 5.

To detect when the drop camera 230 is at the fully extended or dropped position, the system 100 includes a detector 802 configured to detect when the drop camera 230 is fully extended. Looking at FIGS. 8 and 9, the detector 802 has a sensor 805 on the adapter plate 510 configured to detect the position of the drop camera 230. The detector 802 further has a sensor plate 810 on the base 505 with a sensor flange 815 that is positioned proximal to the sensor 805 on the adapter plate 510 when in the fully dropped position. As can be seen, the sensor flange 815 extends in a generally transverse direction relative to the rest of the sensor plate 810. In one form, the sensor 805 is in the form of a proximity sensor, but other types of sensors can be used in other examples. The sensor 805 and the sensor plate 810 are respectively attached to the adapter plate 510 and the base 505 in the illustrated example via fasteners, such as bolts, but the sensor 805 and the sensor plate 810 can be attached in other manners. For example, the sensor plate 810 can be secured to the base 505 via rivets, welding, and/or adhesives. In still yet another example, the sensor plate 810 is integrally formed with the base 505. When the drop camera 230 is at the dropped or fully extended state, the sensor plate 810 is position proximal to the sensor 805 such that the sensor 805 is able to detect the position of the sensor plate 810. With such a detection, the forklift 105 is able to determine that the drop camera 230 is at the proper dropped position.

Figure 10:
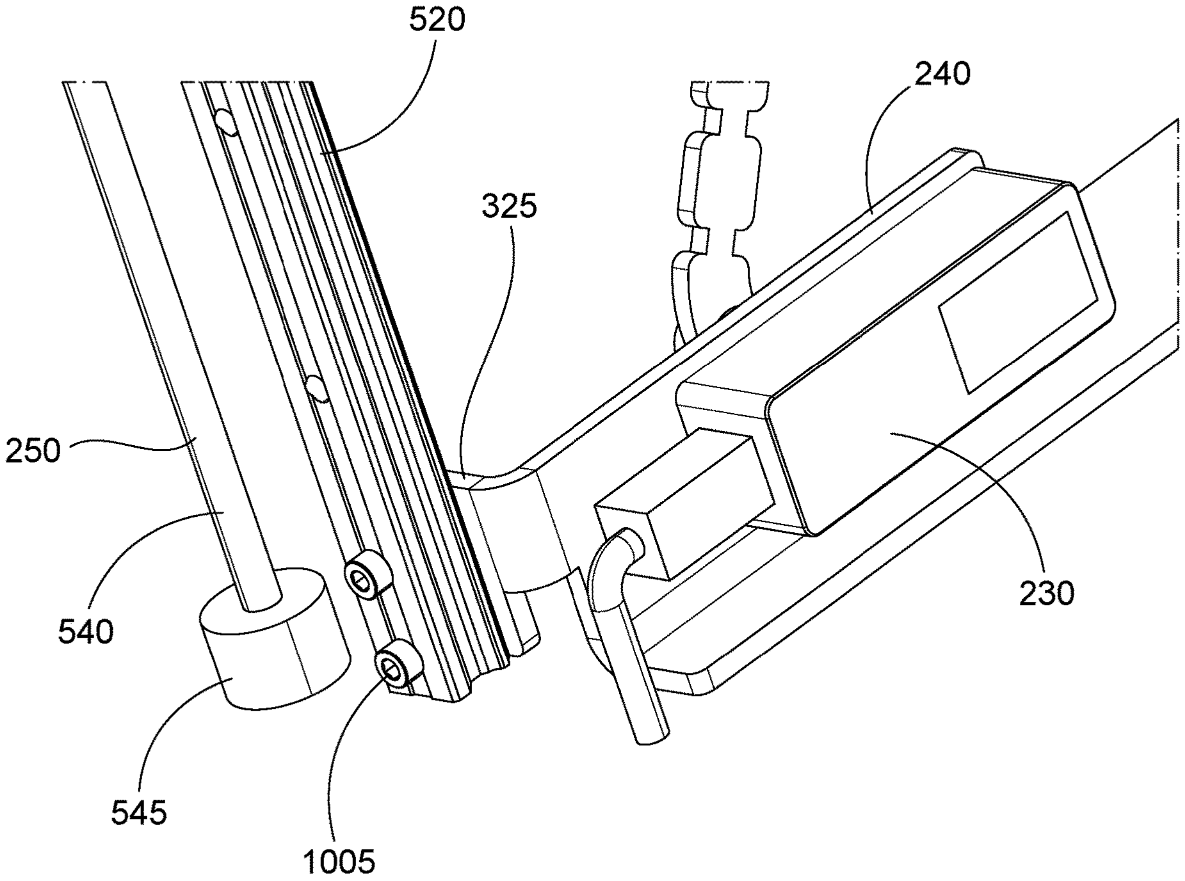
FIG. 10 is an enlarged perspective view of one end of the drop camera assembly of FIG. 3.

FIG. 10 shows an enlarged perspective view of the end of the secondary actuator 250 proximal to the drop camera 230. As noted before, the secondary rod 540 of the secondary actuator 250 has the buffer 545 which is configured to engage the damper 260. As can be seen, the rail flange 325 of the drop frame 240, to which the drop camera 230 is secured, is secured to the rail 520 via one or more fasteners 1005, such as bolts. Once more, the drop frame 240 can be secured to the rail 520 in other manners.

Figure 11:
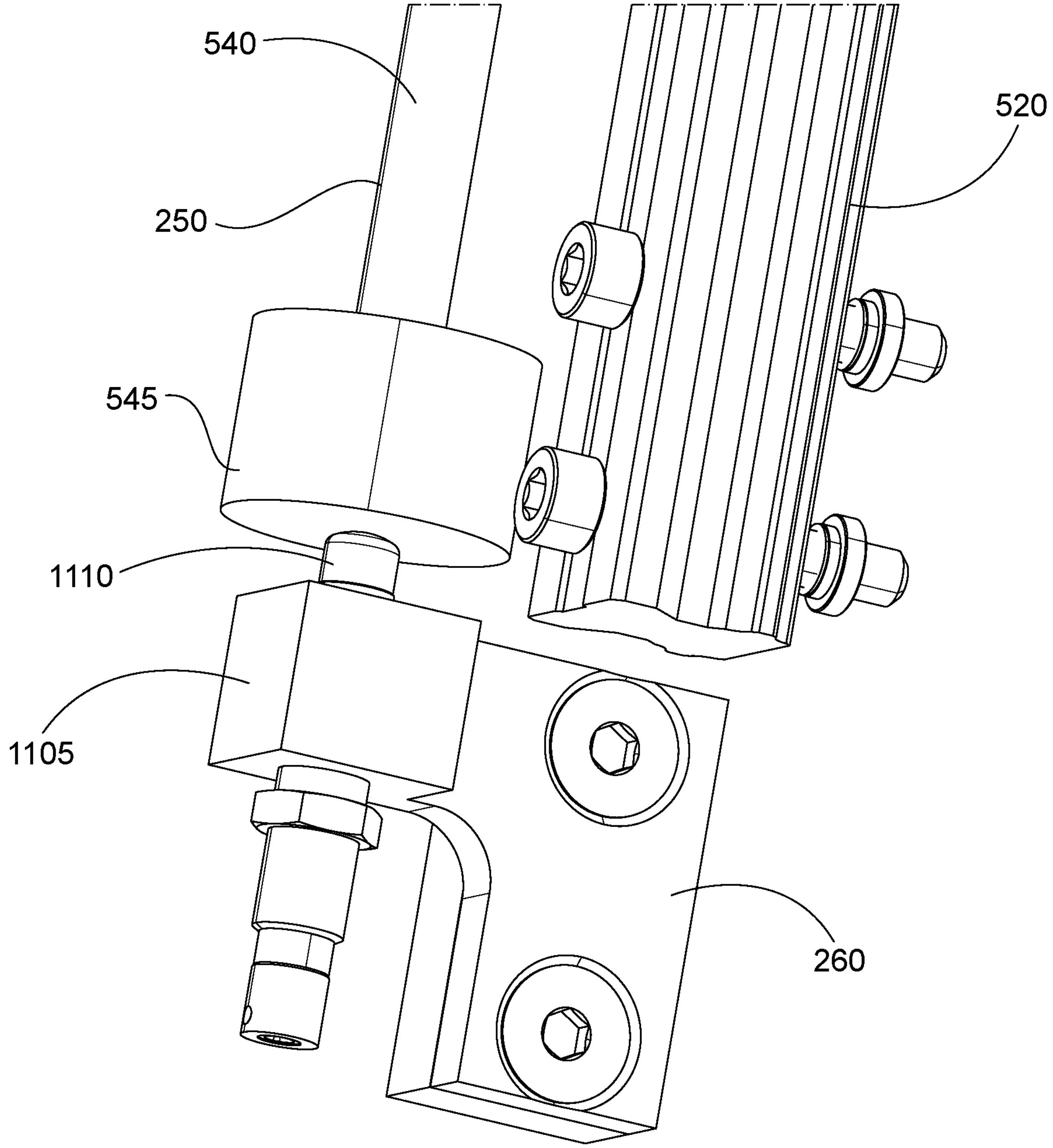
FIG. 11 is an enlarged perspective view of a buffer of a secondary actuator contacting a damper in the drop camera assembly of FIG. 3.

FIG. 11 shows an enlarged perspective view of the buffer 545 of the secondary actuator 250 engaging the damper 260. As shown, the damper 260 includes a stop body 1105 and an adjustable stop member 1110 that is threadedly secured to and extends through the stop body 1105. With the threaded engagement between the stop member 1110 and the stop body 1105, the relative position of the stop member 1110 to the buffer 545 can be adjusted to calibrate the relative location. During retraction, the stop member 1110 contacts the buffer 545 of the secondary actuator 250 which in turn causes compression of the camera position linkage 145.

Figure 12:
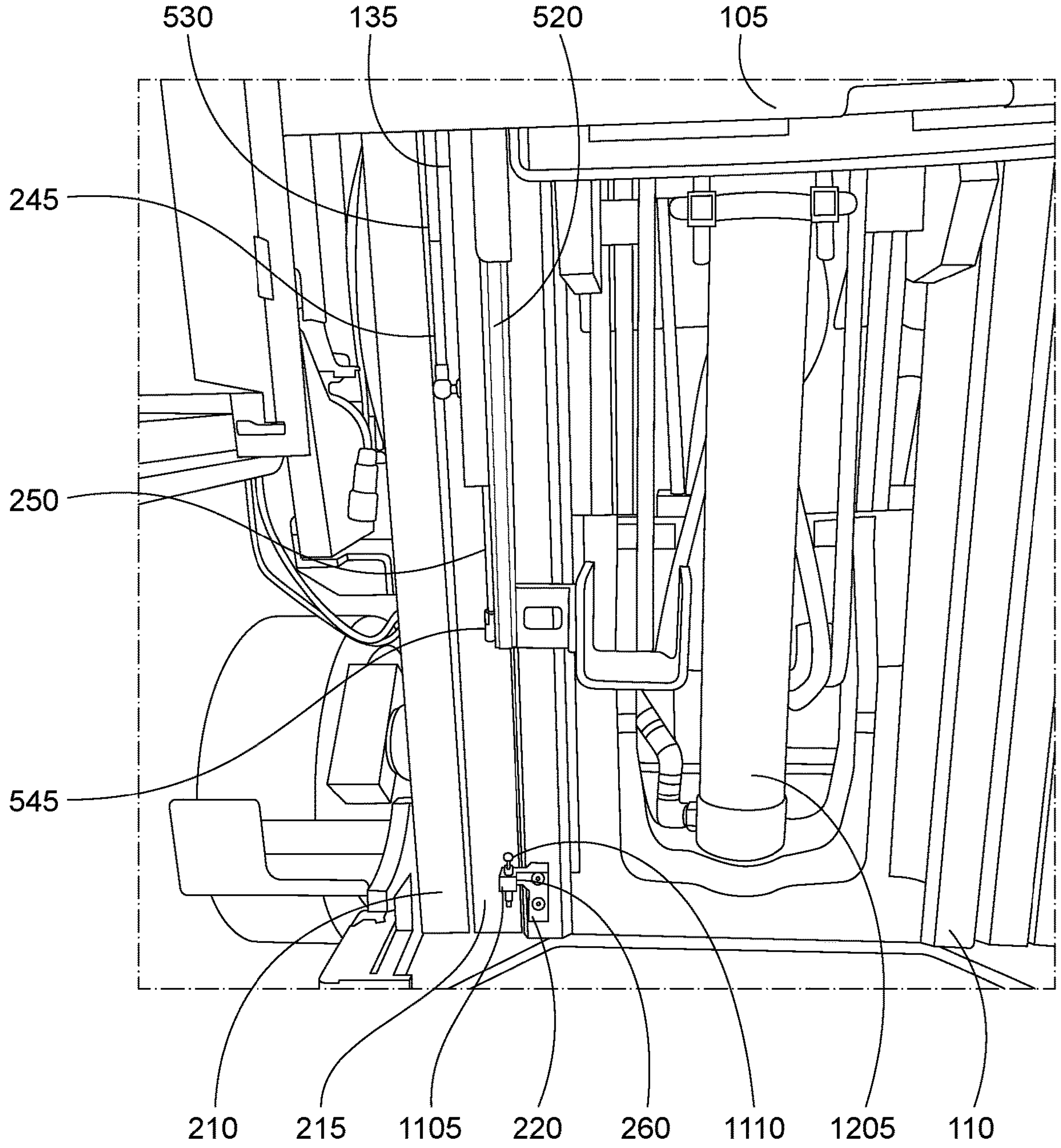
FIG. 12 is a front perspective view of the system of FIG. 1 with selected components removed to aid in visibility.

FIG. 12 shows a perspective view of 1 implementation of the drop camera assembly 135 installed on the mast 110 of the forklift 105, such as an autonomous forklift truck. To enhance visibility of other components, the cameras 140 are removed from the forklift 105 in FIG. 12. The drop camera assembly 135 includes the damper 260 with the stop body 1105 and stop member 1110. As can be seen, the damper 260 is mounted on the carriage rail 220 of the mast 110 which is disposed inside both the stationary rail 210 and intermediate rail 215. As can be seen, the drop camera assembly 135 is in a lowered or dropped position where the buffer 545 is spaced away from the damper 260 such that the primary rod 530 is fully extended. In the illustrated example, the forklift 105 includes a piston 1205 that is configured to raise and lower the carriage 115 along with the stationary rail 210, intermediate rail 215 and carriage rail 220 of the mast 110. When the buffer 545 is pressed against the stop member 1110 of the damper 260, the damper 260 is configured to initiate compression of the secondary actuator 250 when the carriage 115 is lowered.

Figure 13:
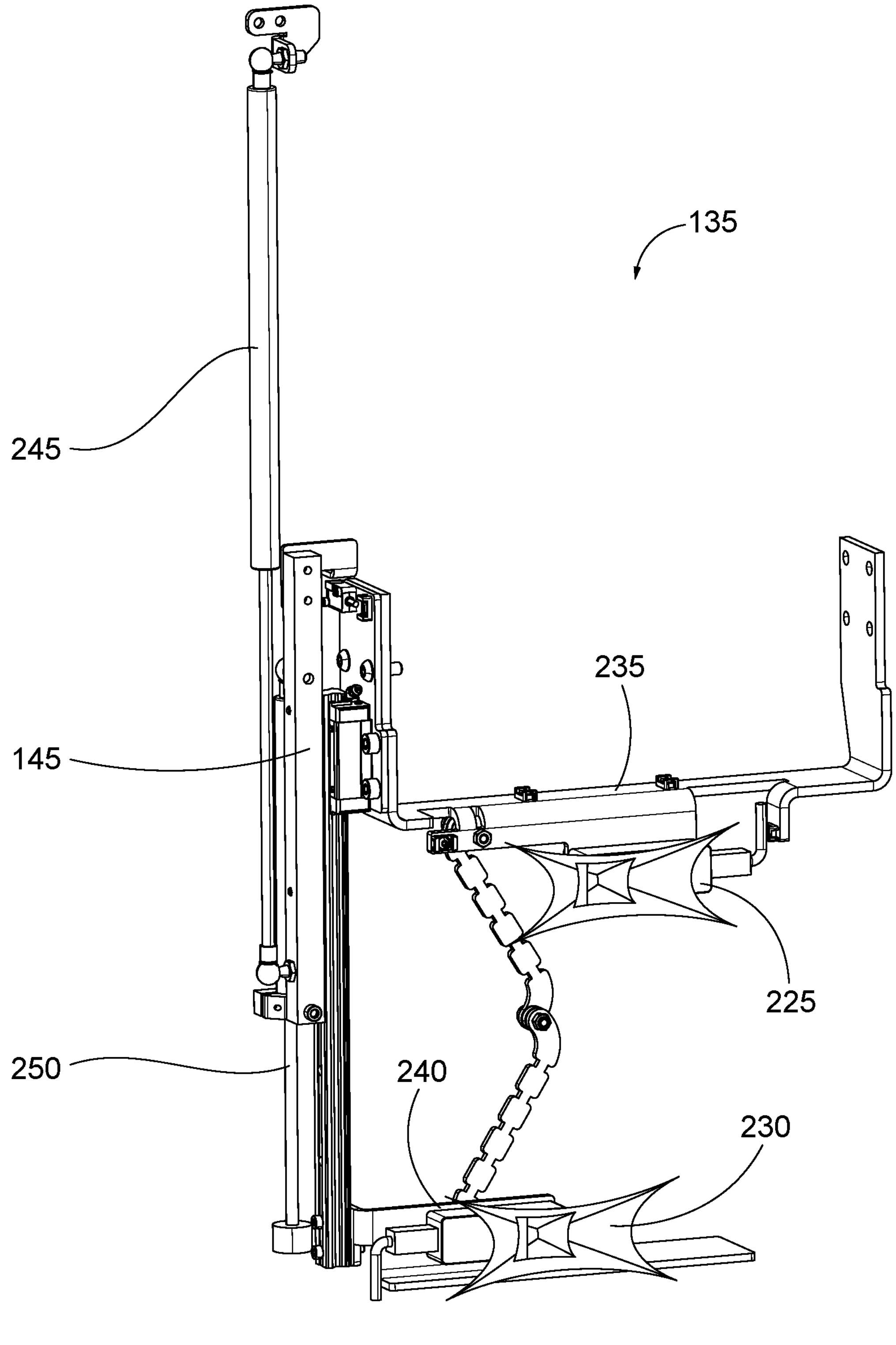
FIG. 13 is a perspective view of the FIG. 3 drop camera assembly in an extended or dropped position.

FIG. 13 shows another perspective view of the drop camera assembly 135 when in an extended position. FIGS. 2, 3, and 4 likewise show the drop camera assembly 135 in the extended or dropped position. As mentioned before, the primary actuator 245 and the secondary actuator 250 are normally biased to an extended state. That is, the primary rod 530 of the primary actuator 245 is biased to fully extend from the primary barrel 525, and the secondary rod 540 of the secondary actuator 250 is biased to fully extend from the secondary barrel 535. When the forks 120 on the carriage 115 are lowered to the floor 150, the damper 260 contacts the buffer 545 on the secondary actuator 250 so as to initiate compression of the primary actuator 245 and the secondary actuator 250. The primary actuator 245 and the secondary actuator 250 store this compression force as potential energy which is later used to extend the primary rod 530 and the secondary rod 540 when the forks 120 of the carriage 115 are raised from the floor 150.

Figure 14:
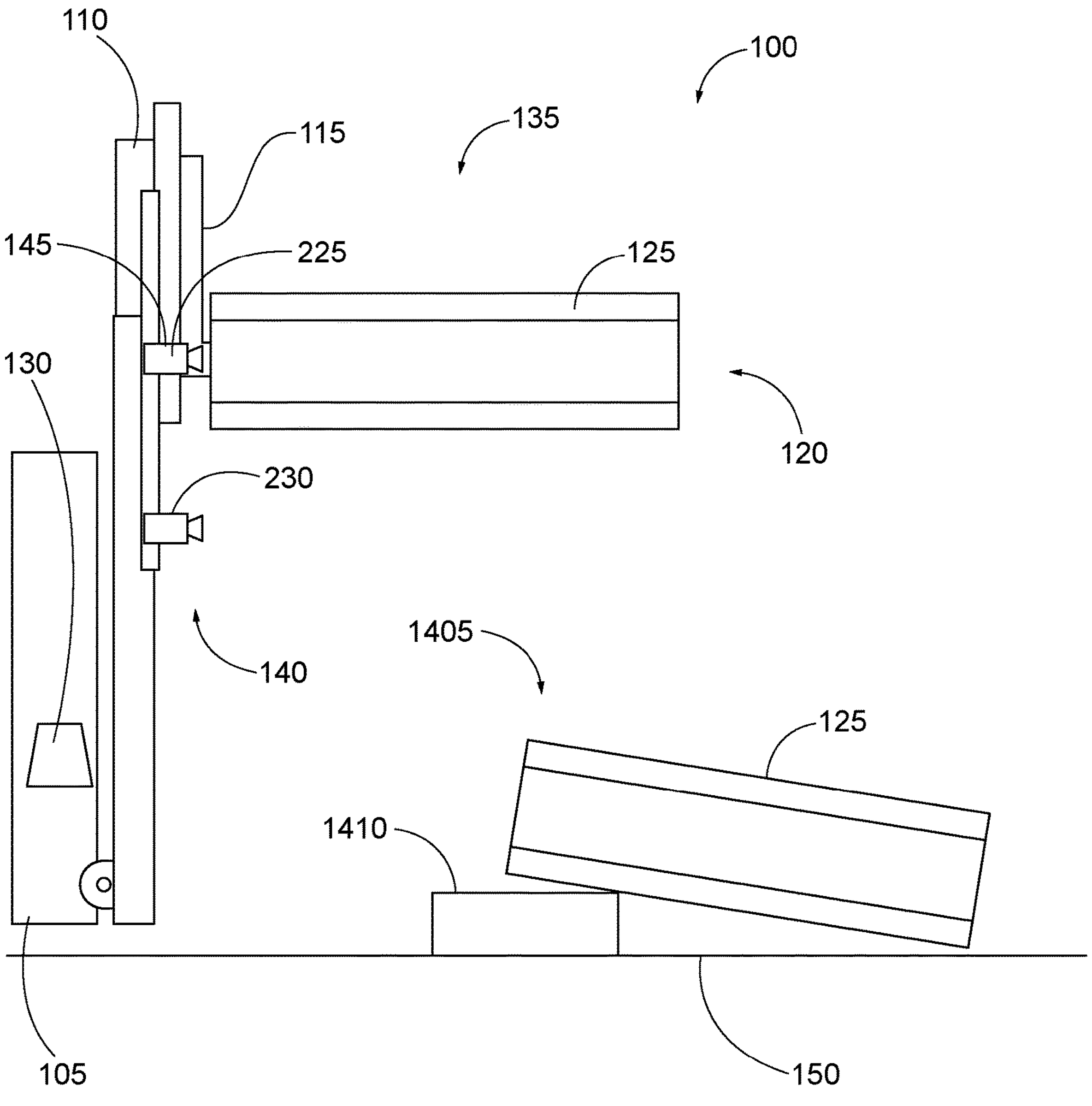
FIG. 14 is a side view of the FIG. 1 system with the FIG. 3 drop camera assembly in the dropped position.

FIG. 14 shows a side view of the system 100 with the drop camera 230 located in an extended or dropped position. With the drop camera 230 via the drop camera assembly 135 being located in the dropped position, the operator of the forklift 105 is able to view any obstructions or obstacles 1405 underneath the pallet 125 on the drop camera 230 of the forklift 105. The obstacles 1405 can for example include one or more containers 1410 or other pallets 125. The obstacles 1405 can come in many forms besides those that are illustrated. With the operator of the forklift 105 being able to see the obstacles 1405, the operator or the autonomous forklift 105 is able to take corrective actions. As a result the pallet 125 will likely not be placed on top of the obstacles 1405.

As noted before, the drop camera assembly 135 includes the primary actuator 245 operatively coupled to the secondary actuator 250. The drop camera assembly 135 is configured to extend the drop camera 230 below the forks 120 and the on-fork pallet 125. In other words, the drop camera assembly 135 drops the drop camera 230 below the currently picked pallet 125 so that the drop camera 230 is able to check to see if another pallet 125 (or an obstacle 1405) is already located at the intended position where the pallet 125 is to be placed. The forklift 105 further has the carriage camera 225 that is statically mounted to the forklift 105 so that the operator is able to view the forks 120 being properly inserted into the pallet openings of the pallet 125. To put it another way, the carriage camera 225 is used to align the forks 120 of the forklift 105 with the pallet 125 that is intended to be picked up by the forklift 105.

In one example, the primary actuator 245 has a lower spring force or resistance to compression than the secondary actuator 250 such that the primary actuator 245 compresses before the secondary actuator 250, and the secondary actuator 250 extends before the primary actuator 245 when the compressive force is removed. In another example, the primary actuator 245 has a higher spring force or resistance to compression than the secondary actuator 250 such that the secondary actuator 250 starts compressing before the primary actuator 245, and the primary actuator 245 extends before the secondary actuator 250 when moving to the dropped position. In still yet other examples, the primary actuator 245 and the secondary actuator 250 are the same such that both the primary actuator 245 and the secondary actuator 250 compress and extend generally at the same time. In one particular version, the primary actuator 245 is actuated when the secondary actuator 250 bottoms out to provide a further range of motion to the drop camera 230 to ensure the drop camera 230 gets out of the way of any lidars 130 that are needed for navigation and/or normal operation of the forklift 105. This secondary actuator 250 provides an initial upwards actuation when the mast 110 and/or carriage 115 moves in a downwards direction. Through the base 505, the secondary actuator 250 presses indirectly against the primary actuator 245. This two-way action is used to ensure that the drop camera assembly 135 can move far enough out of the way of any of the lidars 130. When the carriage 115 along with the mast 110 moves in an upwards direction relative to the floor 150, the primary actuator 245 and the secondary actuator 250 extend to naturally drop the drop camera 230 into position underneath the forks 120.

Figure 15:
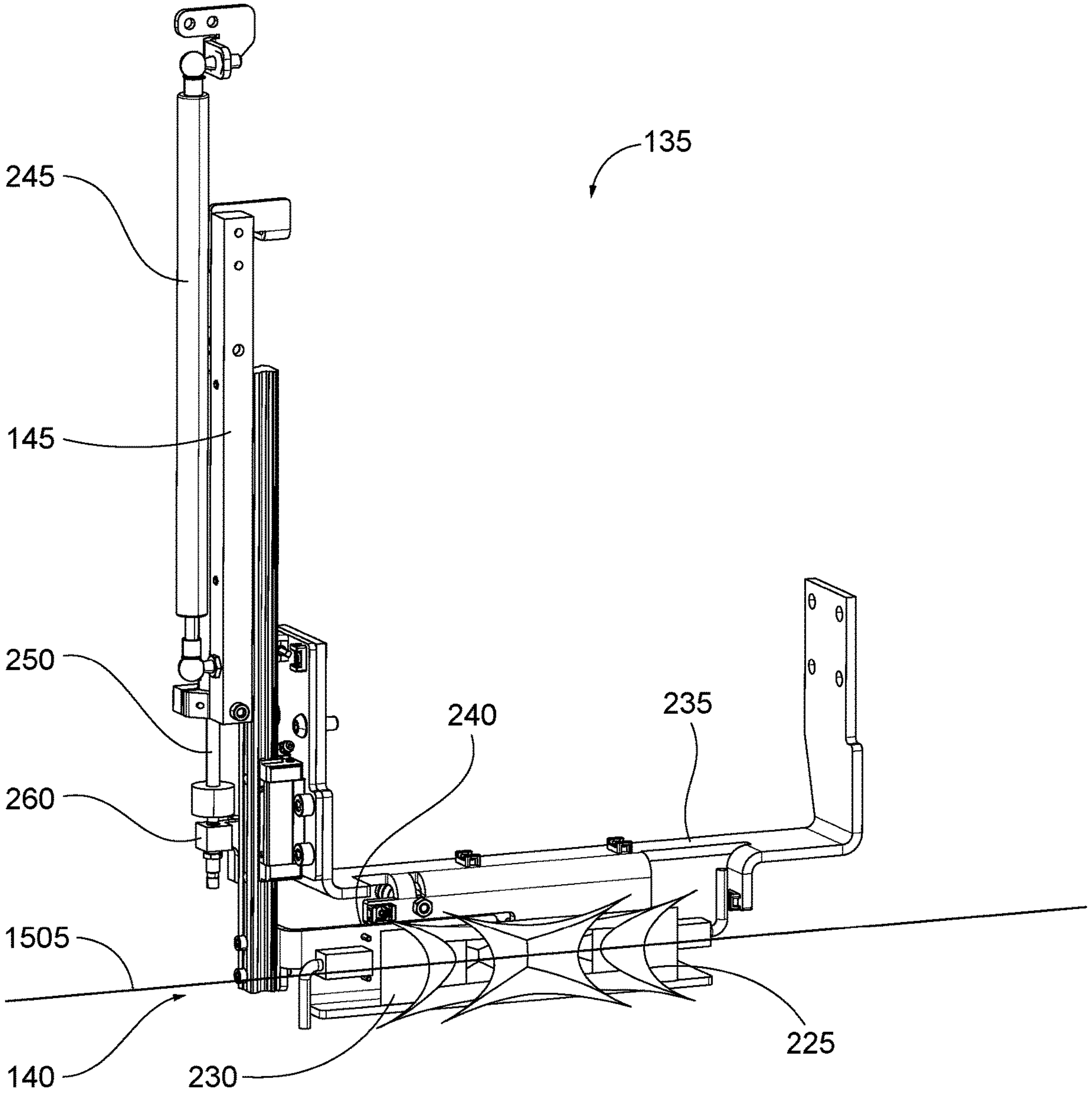
FIG. 15 is a perspective view of the FIG. 3 drop camera assembly in a retracted position.

FIG. 15 shows a perspective view of the drop camera assembly 135 when in a compressed or lowered position. In this position the carriage 115 is lowered near the ground or floor 150 and the drop camera 230 is compressed upwards out of the way of any navigation lidars 130, like in the manner shown in FIG. 1. Referring to FIGS. 1 and 15, the cameras 140 (i.e., the carriage camera 225 and the drop camera 230) are aligned with one another along a longitudinal axis 1505. As can be seen, the carriage camera 225 and the drop camera 230 are located offset from one another along the longitudinal axis 1505 so as to nest together in a compact configuration. As noted before with respect to FIGS. 3 and 4, the guard flange 330 is positioned to protect both the carriage camera 225 and drop camera 230 from striking the floor 150 or any objects on the ground or kicked up during movement of the forklift 105. When the cameras 140 are positioned in such a manner, both the carriage camera 225 and drop camera 230 can be used to align the forks 120 into the fork openings of the pallet 125 so as to facilitate proper alignment between the forklift 105 and the pallet 125. Upon raising the carriage 115 via the mast 110, the drop camera 230 naturally drops or extends below the forks 120 such that any obstacles 1405 can be viewed below the lowered drop camera 230. This process of dropping and retracting can continue in a similar fashion during normal operation of the forklift 105.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Actuator" generally refers to a device that converts energy into motion. In other words, the actuator is a type of transducer that takes one form of energy and converts the energy into another form such as by converting electrical energy into mechanical motion. Actuators can be generally categorized into two types, linear actuators and rotary actuators. Linear actuators produce linear motion such as in the case of moving a piston rod. Rotary actuators produce rotary motion such as in the case of a shaft of an electric motor. Some common types of actuators include electric motors, pneumatic cylinders, hydraulic cylinders, solenoids, and piezoelectric actuators, to name just a few examples.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Automated Guided Vehicle" (AGV) or "Autonomous Mobile Unit" (AMU) generally refers to a mobile robot that is able to automatically self-navigate between various locations. For example, AGVs are typically, but not always, able to automatically navigate by following markers, such as wires or magnets embedded in the floor, by using lasers, and/or by using one or more vision systems. AGVs are also typically, but not always, designed to automatically avoid collisions, such as with other AGVs, equipment, and personnel. AGVs are commonly, but not always, used in industrial applications to move materials around a manufacturing facility or warehouse.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Camera" generally refers to a device that records visual images. Typically, a camera may record two- and/or three-dimensional images. In some examples, images are recorded in the form of film, photographs, image signals, and/or video signals. A camera may include one or more lenses or other devices that focus light onto a light-sensitive surface, for example a digital light sensor or photographic film. The light-sensitive surface may react to and be capable of capturing visible light or other types of light, such as infrared (IR) and/or ultraviolet (UV) light.

"Container" generally refers to an object creating a partially or fully enclosed space that can be used to contain, store, and transport objects, items, and/or materials. In other words, a container can include an object that can be used to hold or transport something. By way of non-limiting examples, containers can include boxes, cartons, plastic packaging, totes, bags, jars, envelopes, barrels, cans, bottles, drums, and/or packages.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Floor" generally refers to the flat base panel of a vehicle where the support structures are mounted. The floor can be made of many different materials such as wood, plastics, metals, rubbers, or a combination of materials. The floor may have tracks or mounting brackets for mounting support structures that are flush with the rest of the floor and/or protrude above the standard floor height. The floor of a vehicle is also the primary area for storage as that is where the items are set. For example, when loading the back of a van, the groceries are typically set on the floor. Additionally, the floor may be covered in a material to make it more comfortable. Some materials used may be carpet, rubber, metals, or leathers.

"Fluid" generally refers to a substance that does not have a fixed shape. For example, a fluid includes a liquid and/or a gas. Typically, fluids are able to flow easily, such as air flowing over a wing, blood flowing through a circulatory system, water flowing through plumbing, or oil flowing through a motor as examples. In some cases, a fluid refers to a mixture of solids, liquids, and/or gases. For example, a slurry of solids and water, liquid droplets mixed with air, aerated solid particles, a mixture of solids with liquids and gases, and/or other mixtures of different materials may be fluids.

"Forklift Truck", "Forklift", or "Fork Truck" generally refers to a vehicle with one or more prongs, blades, forks, or other parts that can be slid into or under loads and then raised or lowered in order to move and/or stack the loads. In a common arrangement, the forklift truck has two forks that can be slid into a pallet that carries a load. The forks are typically raised and lowered along a forklift mast. In certain designs, the mast and/or forks can be tilted so as to better retain the carried load. The forklift truck can be operated by a human operator, semi-autonomously controlled, or even fully autonomous. In one example of a fully autonomous design, the forklift truck is an Autonomously Guided Vehicle (AGV). Forklift trucks can be used in a wide variety of environments, such as in warehouses, lumberyards, manufacturing plants, and shipping depots, to name just a few examples. The forklift trucks can be powered in several manners, such as by using internal combustion engines (e.g., with liquefied petroleum gas, or LPG), via battery-electric powerplants, and/or hydrogen fuel cells. Some non-limiting forklift truck design types include low lift trucks, stackers, reach trucks, side loaders, order-picking trucks, guided very-narrow-aisle trucks, articulated counterbalance trucks, and omnidirectional trucks, to name just a few.

"Frame" generally refers to a structure that forms part of an object and gives strength and/or shape to the object.

"Gas Spring", "Gas Strut", or "Pneumatic Spring" generally refers to a type of spring that uses the compressibility of a gas contained within an enclosed container to store potential energy as well as to exert a force and provide controlled movement. Unlike a traditional mechanical spring that uses elastic deformation to store energy, a gas spring uses the compressibility of a gas, such as nitrogen. This allows gas springs to provide a more consistent and predictable force over longer stroke lengths. In one example, the compressed gas is contained within an enclosed cylinder or barrel. The cylinder is sealed by a sliding piston and/or piston rod to pneumatically store potential energy and generally withstand external, longitudinal forces applied to the piston rod. In one version, the piston separates the cylinder into two chambers, one filled with the gas and the other filled with another fluid, like liquid oil. As the force is applied to the piston rod, the gas in the cylinder compresses, forcing the oil through a small orifice. This controlled flow of oil creates a damping effect, which slows down the movement of the piston rod and provides a smooth and controlled motion.

"Lidar" or "Laser Imaging, Detection, and Ranging" generally refers to a device and/or method for determining distances to objects by shining a laser beam at the object or surface and measuring the time for the reflected light to return to the device. Lidar operates in a manner similar to radar, but the lidar device emits pulsed laser light instead of radio waves or microwaves. Lidar is commonly used to make high resolution three-dimensional maps in a wide variety of applications, like for surveying, forestry, and autonomous vehicle operations.

"Longitudinal" generally refers to the length or lengthwise dimension of an object, rather than across.

"Notch" generally refers to an indentation, cut, groove, channel, and/or incision on an edge or surface. In some non-limiting examples, the notch includes a V-shaped or U-shaped indentation carved, scratched, etched, stamped, and/or otherwise formed in the edge or surface. The notch can have a uniform shape or a non-uniform shape.

"Opening" generally refers to a space or hole that something can pass through.

"Original Equipment Manufacturer" or "OEM" generally refers to an organization that makes finished devices from component parts bought from other organizations that are usually sold under their own brand in a consumer or commercial market.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top, load deck upon which items are stacked, a bottom, support deck that rests on the ground, and a spacer structure positioned between the load and support decks to receive the forks of the forklift or pallet jack. However, the pallets can be configured differently. For example, the term pallet is used in a broader sense to include skids that have no support deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic. The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 system
105 forklift
110 mast
115 carriage
120 forks
125 pallet
130 lidar
135 drop camera assembly
140 cameras
145 camera position linkage
150 floor
205 rails
210 stationary rail
215 intermediate rail
220 carriage rail
225 carriage camera
230 drop camera
235 carriage frame
240 drop frame
245 primary actuator
250 secondary actuator
255 primary actuator mount
260 damper
305 frame arms
310 frame base
315 carriage camera flange
320 fastener openings
325 rail flange
330 guard flange
335 frame linkage
340 linkage arms
345 notches
505 base
510 adapter plate
515 rail bearing
520 rail
525 primary barrel
530 primary rod
535 secondary barrel
540 secondary rod
545 buffer
705 rail channel
802 detector
805 sensor
810 sensor plate
815 sensor flange
1005 fasteners
1105 stop body
1110 stop member
1205 piston
1405 obstacles
1410 containers
1505 longitudinal axis

What is claimed is:

1. A system, comprising:
a carriage having one or more forks;
a carriage rail coupled to the carriage;
a drop camera assembly including a drop camera;
wherein the drop camera is configured to move from a retracted position to an extended position;
wherein the drop camera is located proximal to the forks when in the retracted position;
wherein the drop camera is positioned away from the carriage when in the extended position;
wherein the drop camera is configured to image one or more obstacles under the forks of the carriage;
a camera position linkage coupled to the drop camera;
wherein the camera position linkage is configured to extend the drop camera to the extended position;
wherein the camera position linkage is configured to retract the drop camera to the retracted position;
wherein the camera position linkage includes a primary actuator and a secondary actuator;
wherein the primary actuator and the secondary actuator are biased to extend the drop camera to the extended position; and
a damper mounted to the carriage rail to compress the primary actuator and the secondary actuator to retract the drop camera to the retracted position when the carriage lowered.

2. The system of claim 1, wherein:
the drop camera assembly includes a carriage camera;
the carriage camera is secured to the carriage; and
the carriage camera is configured to show alignment of the forks relative to a pallet.

3. The system of claim 2, wherein the drop camera and the carriage camera are located offset to one another to facilitate nesting of the drop camera and the carriage camera.

4. A system comprising:
a carriage having one or more forks;
a drop camera assembly including a drop camera;
wherein the drop camera is configured to move from a retracted position to an extended position;
wherein the drop camera is located proximal to the forks when in the retracted position;
wherein the drop camera is positioned away from the carriage when in the extended position;
wherein the drop camera is configured to image one or more obstacles under the forks of the carriage;
wherein the drop camera assembly includes a carriage camera;
wherein the carriage camera is secured to the carriage;
wherein the carriage camera is configured to show alignment of the forks relative to a pallet;
wherein the drop camera and the carriage camera are located offset to one another to facilitate nesting of the drop camera and the carriage camera;
wherein the drop camera assembly includes a carriage frame to which the carriage camera is secured;
wherein the drop camera assembly includes a drop frame to which the drop camera is secured;
wherein the drop camera assembly includes a camera position linkage coupling the carriage frame to the drop frame;
wherein the camera position linkage is configured to extend the drop camera to the extended position; and
wherein the camera position linkage is configured to retract the drop camera to the retracted position.

5. The system of claim 4, wherein:
the drop frame includes a guard flange; and
the guard flange extends past the drop camera to cover the carriage camera when the drop camera and the carriage camera are nested together.

6. The system of claim 4, wherein:
the drop camera assembly includes a frame linkage coupling the carriage frame to the drop frame;
the frame linkage is configured to fold when the drop camera is in the retracted position; and
the frame linkage is configured to unfold when the drop camera is in the extended position.

7. The system of claim 4, wherein the camera position linkage is biased to extend the drop camera to the extended position in a passive manner.

8. The system of claim 4, wherein the camera position linkage uses a two-way action to extend the drop camera to the extended position.

9. The system of claim 4, wherein the camera position linkage includes one or more actuators configured to facilitate extension and retraction of the drop camera.

10. The system of claim 9, wherein the actuators include gas springs.

11. The system of claim 9, wherein:
the camera position linkage includes a rail;
the camera position linkage includes a rail bearing;
the rail bearing is slidably coupled to the rail;
the camera position linkage includes a base;
the base is secured to the rail; and
the actuators are coupled to the base.

12. The system of claim 11, wherein the actuators include a primary actuator and a secondary actuator.

13. The system of claim 12, wherein:
the primary actuator includes a primary barrel and a primary rod extending from the primary barrel;
the primary rod is configured to move in a reciprocating manner relative to the primary barrel;
the camera position linkage includes a primary actuator mount;
the primary barrel is coupled to the primary actuator mount; and
the primary rod is coupled to the base.

14. The system of claim 13, wherein:
the secondary actuator includes a secondary barrel and a secondary rod extending from the secondary barrel;
the secondary rod is configured to move in a reciprocating manner relative to the secondary barrel;
the secondary barrel is secured to the base;
the drop camera assembly includes a damper;
the damper is secured to a mast;
the secondary rod has a buffer configured to contact the damper; and
the damper is configured to compress the primary actuator and the secondary actuator to have the drop camera at the retracted position.

15. The system of claim 1, further comprising:
a detector is configured to detect when the drop camera is in the extended position.

16. The system of claim 1, further comprising:
a forklift having the carriage;
wherein the forklift has a lidar; and
wherein the drop camera assembly is configured to position the drop camera to avoid interference with the lidar.

17. A method, comprising:
raising one or more forks of a forklift;
lowering a drop camera to a dropped position below the forks of the forklift with a camera position linkage;
wherein the camera position linkage includes a primary actuator and a secondary actuator;
wherein the lowering the drop camera to the dropped position includes moving the drop camera with the primary actuator and the secondary actuator biased to extend the drop camera to the dropped position;
viewing an obstacle below the forks with the drop camera;
lowering the forks of the forklift;
compressing the primary actuator and the secondary actuator with a damper during the lowering the forks to retract the drop camera to a retracted position; and
wherein the drop camera is located proximal to the forks when in the retracted position.

18. The method of claim 17, further comprising: aligning the forks with one or more fork openings in a pallet by viewing with a carriage camera that is located at a stationary position relative to the forks; and wherein the raising includes picking up the pallet with the forks.

19. A method comprising:
raising one or more forks of a forklift;
lowering a drop camera to a dropped position below the forks of the forklift;
viewing an obstacle below the forks with the drop camera;
lowering the forks of the forklift;
moving the drop camera to a retracted position where the drop camera is aligned with the forks;

aligning the forks with one or more fork openings in a pallet by viewing with a carriage camera that is located at a stationary position relative to the forks;

wherein the raising includes picking up the pallet with the forks, and nesting the drop camera with the carriage camera at the retracted position.

20. The method of claim 19, wherein:

the lowering the drop camera to the dropped position includes moving the drop camera with an actuator biased to extend the drop camera to the dropped position; and the moving the drop camera to the retracted position includes compressing the actuator with a damper during the lowering the forks.

* * * * *